(12) United States Patent
Cronin et al.

(10) Patent No.: US 11,002,391 B2
(45) Date of Patent: *May 11, 2021

(54) HIGH PRESSURE BI-DIRECTIONAL SEALING SYSTEM

(71) Applicant: SAINT-GOBAIN PERFORMANCE PLASTICS CORPORATION, Solon, OH (US)

(72) Inventors: Craig J. Cronin, North Haven, CT (US); Mark W. Armitage, Madison, CT (US); Dallas Conway, Prospect, CT (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 37 days.

This patent is subject to a terminal disclaimer.

(21) Appl. No.: 16/397,700

(22) Filed: Apr. 29, 2019

(65) Prior Publication Data

US 2019/0316713 A1 Oct. 17, 2019

Related U.S. Application Data

(60) Continuation of application No. 15/361,462, filed on Nov. 27, 2016, now Pat. No. 10,274,117, which is a
(Continued)

(51) Int. Cl.
*F16L 27/12* (2006.01)
*F16J 15/16* (2006.01)
(Continued)

(52) U.S. Cl.
CPC .......... *F16L 27/125* (2013.01); *F16J 15/166* (2013.01); *F16J 15/18* (2013.01); *F16J 15/3236* (2013.01); *F16J 15/56* (2013.01); *F16L 17/035* (2013.01)

(58) Field of Classification Search
CPC ..... F16L 17/035; F16L 17/025; F16L 17/125; F16L 17/073; F16L 17/067; F16L 27/125; (Continued)

(56) References Cited

U.S. PATENT DOCUMENTS 2,430,445 A 11/1947 Aamodt et al.
2,839,089 A 6/1958 Rickard et al.
(Continued)

OTHER PUBLICATIONS

International Search Report for PCT/US2014/046565, dated Nov. 10, 2014, 1 page.

*Primary Examiner* — Zachary T Dragicevich
(74) *Attorney, Agent, or Firm* — Abel Schillinger, LLP; Chi Suk Kim

(57) ABSTRACT

The present invention is directed to a high-pressure bi-directional sealing system having circumferentially extending outer support rings (1520, 1900), annular, axial seals (1600, 1800) between the outer support rings (1520, 1900) and a circumferentially extending inner support ring (1700) located between the annular, axial seals (1600, 1800). The outer support rings (1520, 1900), seals (1600, 1800), and circumferentially extending inner support ring (1700) are located within a space between an outer tube (1502) and an inner tube (1504) that is telescopically disposed within the outer tube (1502). Seals (1600) and (1800) are oriented in opposite directions. Specifically, the opening of seal (1600) is facing in a first direction and the opening of seal (1800) is facing in a second direction that is opposite the first direction. This configuration enables the high-pressure bi-directional sealing system to handle pressure in both directions.

19 Claims, 15 Drawing Sheets

Related U.S. Application Data division of application No. 13/943,997, filed on Jul. 17, 2013, now Pat. No. 9,506,588.

(51) Int. Cl.
 *F16J 15/18* (2006.01)
 *F16L 17/035* (2006.01)
 *F16J 15/56* (2006.01)
 *F16J 15/3236* (2016.01)

(58) Field of Classification Search
 CPC ........ F16J 15/18; F16J 15/166; F16J 15/3236; F16J 15/56
 USPC .................. 277/603, 529, 530, 342; 285/351
 See application file for complete search history.

(56) References Cited

U.S. PATENT DOCUMENTS

| | | |
|---|---|---|
| 2,840,350 A | 6/1958 | Pierce |
| 2,922,665 A | 1/1960 | Beyer |
| 3,185,504 A | 5/1965 | Perrot et al. |
| 3,447,819 A | 6/1969 | Borsum et al. |
| 3,656,784 A | 4/1972 | Dow et al. |
| 3,680,874 A | 8/1972 | Schwarz |
| 3,779,564 A | 12/1973 | Chookazian |
| 3,837,687 A | 9/1974 | Leonard |
| 4,456,288 A | 6/1984 | Conner |
| 4,552,385 A | 11/1985 | Peting |
| 5,158,305 A | 10/1992 | Hailing |
| 5,232,252 A | 8/1993 | Bartholomew |
| 5,433,183 A | 7/1995 | Vansnick |
| 5,997,003 A | 12/1999 | Turner |
| 6,027,125 A | 2/2000 | Guest |
| 6,131,960 A | 10/2000 | McHughs |
| 6,318,729 B1 | 11/2001 | Pitts, Jr. et al. |
| 7,445,047 B2 * | 11/2008 | Gomez ................ 277/342 |
| 8,794,638 B2 | 8/2014 | Tuckness et al. |
| 2005/0275169 A1 | 12/2005 | Kish et al. |
| 2008/0012296 A1 | 1/2008 | Johnston et al. |
| 2008/0224422 A1 | 9/2008 | Hailing |
| 2011/0061857 A1 | 3/2011 | White |
| 2013/0020799 A1 | 1/2013 | Silveira et al. |
| 2013/0087977 A1 | 4/2013 | Galle et al. |

\* cited by examiner

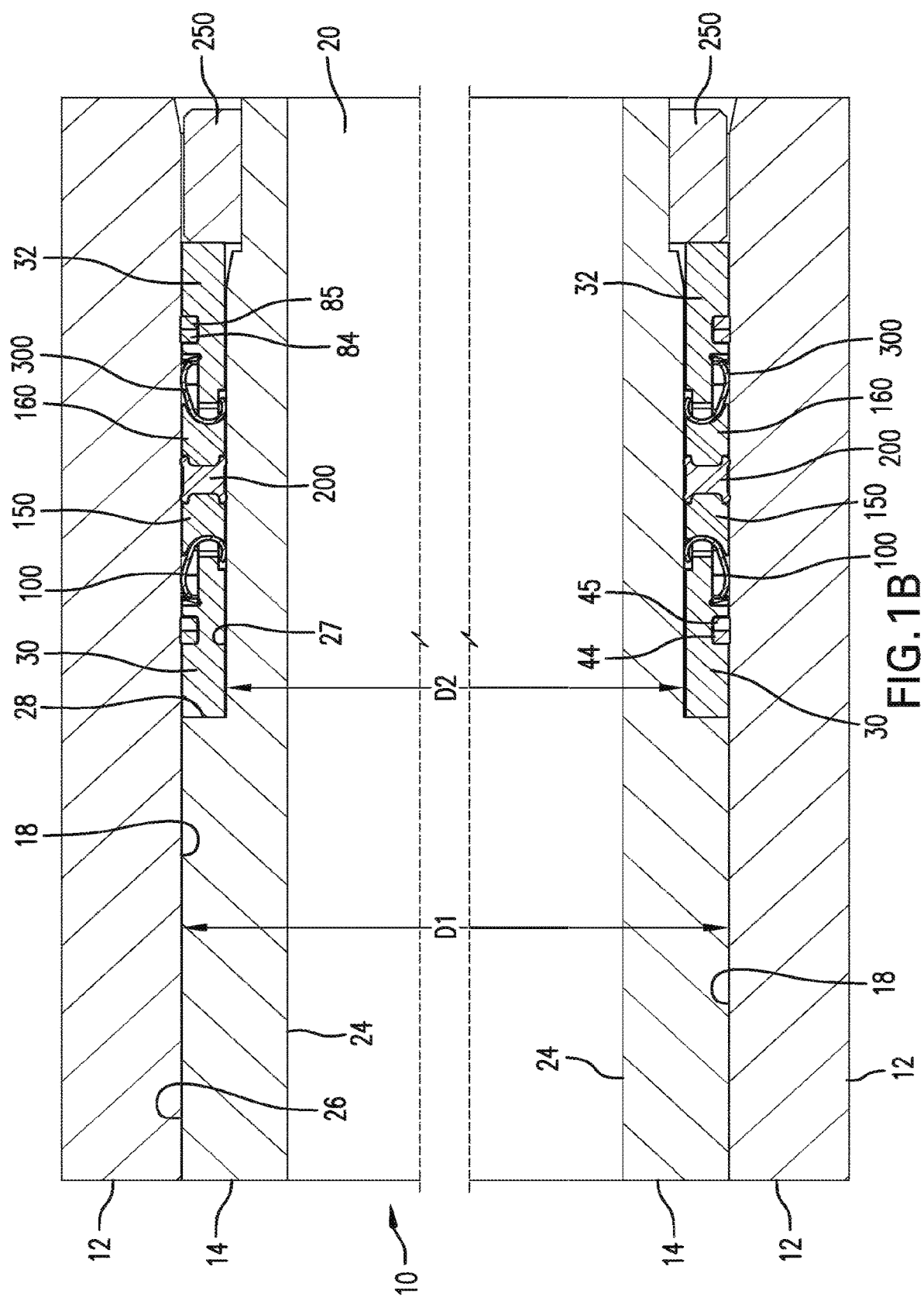

HIGH PRESSURE BI-DIRECTIONAL SEALING SYSTEM

CROSS-REFERENCE TO RELATED APPLICATIONS

This application is a continuation of and claims priority under 35 U.S.C. 120 to U.S. patent application Ser. No. 15/361,462, filed Nov. 27, 2016, entitled "High Pressure Bi-Directional Sealing System," naming Craig J. CRONIN, Mark W. ARMITAGE, and Dallas CONWAY as Inventors, now U.S. Pat. No. 10,274,117, which is a divisional of U.S. patent application Ser. No. 13/943,997, filed on Jul. 17, 2013, entitled "High Pressure Bi-Directional Sealing System," naming Craig J. CRONIN, Mark W. ARMITAGE, and Dallas CONWAY as Inventors, now U.S. Pat. No. 9,506,588, which applications are assigned to the current assignee hereof and are incorporated by reference herein in their entireties.

BACKGROUND OF THE INVENTION

Field of the Invention

The present invention generally relates to sealing systems.

Related Art

Various prior art sealing systems are shown in U.S. Pat. Nos. 6,131,960, 6,027,125, 5,433,183, 5,232,252, 4,552,385, 4,456,288, 3,837,687, 3,779,564, 3,656,784, 3,680,874, 3,447,819, 3,185,504, 2,922,665, 2,840,350, 2,839,089, and 2,430,445.

SUMMARY OF THE INVENTION

The present invention is directed to, in one embodiment, a sealing assembly, comprising an outer tube (12) having an interior region and an interior surface (18) surrounding the interior region and an inner tube (14) telescopically disposed within the interior region of the outer tube (12) such that the outer tube (12) and inner tube (14) can move axially with respect to each other and rotate with respect to each other. The inner tube (14) has a first portion having a first outer diameter (D1) and a second portion having a second outer diameter (D2) that is less than the first outer diameter (D1). The difference in the outer diameters D1 and D2 forms a circumferentially extending shoulder (27), a circumferentially extending wall (28) that is contiguous with the shoulder (27) and a circumferentially extending space between shoulder (27) and interior surface (18) of the outer tube (12). The wall (28) forms a boundary between the first portion of the inner tube (14) which has the first outer diameter (D1) and the second portion of the inner tube (14) which has the second outer diameter (D2). The inner tube (14) has an exterior surface (26) of which the shoulder (27) is a portion.

The sealing system (10) further comprises a first outer support ring (30) positioned on the shoulder (27) and abutting the wall (28). The first outer support ring (30) has a seal support section (33) that is shaped so as to form a first space (34) between the seal support section (33) and the interior surface (18) of the outer tube (12) and a second space (35) between the seal support section (33) and exterior surface (26) of the inner tube (14). The sealing system (10) further comprises a first annular seal (100) interference fitted between interior surface (18) of outer tube (12) and shoulder (27). The first annular seal (100) has a first portion (132) upon which dynamic forces are exerted and which contacts the interior surface (18) of the outer tube (12) and a second portion (134) upon which no dynamic forces are exerted. The second portion (134) bears against the shoulder (27). The first portion (132) of the first annular seal (100) is positioned in the first space (34) between the seal support section (33) and interior surface (18) of the outer tube (12) and the second portion (134) of the first annular seal (100) is positioned in the second space (35) between the seal support section (33) and the shoulder (27). The first annular seal (100) comprises an arcuate portion (107) which has a curved inner surface (107A). The seal support section (33) abuts the curved inner surface (107A).

The sealing system (10) further comprises a first circumferentially extending inner support ring (150) positioned between the shoulder (27) and the interior surface (18). The inner support ring (150) has a first sidewall (152) and an opposite sidewall (154). The first sidewall (152) has a curvature that extends for the entire circumference of the inner support ring (150) and is sized and shaped for receiving the arcuate portion (107) of the seal (100). The sealing system (10) further comprises a circumferentially extending center shock absorbing seal (200) that is interference fitted between the interior surface (18) and shoulder (27) and comprises a first sidewall (202) that abuts the sidewall (154) of inner support ring (150) and an opposite second sidewall (204). The sealing system (10) further comprises a second circumferentially extending inner support ring (160) positioned between the shoulder (27) and the interior surface (18). The inner support ring (160) has a first sidewall (162) and an opposite sidewall (164). The first sidewall (162) has a curvature that extends for the entire circumference of the inner support ring (160) and the opposite sidewall (164) abuts the sidewall (204) of center shock absorbing seal (200).

The sealing system (10) further comprises a second annular seal (300) interference fitted between interior surface (18) of outer tube (12) and shoulder (27). The second annular seal (300) has a first portion (310) upon which dynamic forces are exerted and which contacts the interior surface (18) of the outer tube (12) and a second portion (306) upon which no dynamic forces are exerted. The second portion (306) bears against the shoulder (27). The second annular seal (300) further comprises an arcuate portion (307) that is positioned within the curvature of the sidewall (162) of inner support ring (160). The arcuate portion (307) comprises a curved inner surface (308).

The sealing system (10) further comprises a second outer support ring (32) positioned on the shoulder (27). The second outer support ring (32) comprises a seal support section (62) that abuts the curved inner surface (308) of second annular seal (300). The seal support section (62) has a structure which forms a first space (140) between the seal support section (62) and the interior surface (18) of the outer tube (12) and a second space (142) between the seal support section (62) and the shoulder (27). The first portion (304) of the second annular seal (300) is positioned in the first space (140) and the second portion (306) of the second annular seal (300) is positioned in the second space (142) between the seal support section (62) and the shoulder (27). The sealing system (10) further comprises a retaining member (250) mounted to the inner tube (14) such that the outer support ring (30), the seal (100), inner support ring (150), center shock absorbing seal (200), the inner support ring (160), the seal (300) and the outer support ring (32) are positioned between the wall (28) and the retaining member (250). The retaining member (250) abuts the second outer support ring (32).

Other embodiments of the sealing system of the present invention are also described herein.

BRIEF DESCRIPTION OF THE DRAWINGS

The foregoing features of the present invention will become more readily apparent and may be understood by referring to the following detailed description of an illustrative embodiment of the present invention, taken in conjunction with the accompanying drawings, in which:

FIG. 1B is an enlarged cross-sectional view of the high-pressure bi-directional sealing system;

DETAILED DESCRIPTION OF THE INVENTION

The high-pressure bi-directional sealing system of the present invention is configured to have any type of matter flow there through. As used herein, the terms "matter" or "flowing matter" include, but are not limited to, high pressure fluids, medium pressure fluids, low pressure fluids, non-pressurized fluids, water, hydraulic fluid, petroleum, fuels, chemicals, non-fluid type matter such as fertilizers, raw food constituents (e.g. wheat, barley, flour, corn, etc.) etc. The high-pressure bi-directional sealing system of the present invention can also operate under vacuum pressure.

As used herein, the term "dynamic portion" refers to a portion of a seal that undergoes dynamic forces as that portion of the seal (1) contacts a moving surface or (2) moves or slides upon a stationary surface.

As used herein, the term "static portion" refers to a portion of a seal that (1) does not undergo any dynamic forces, (2) does not contact any moving surfaces, and (3) does not move or slide upon a stationary surface.

Figure 1A:
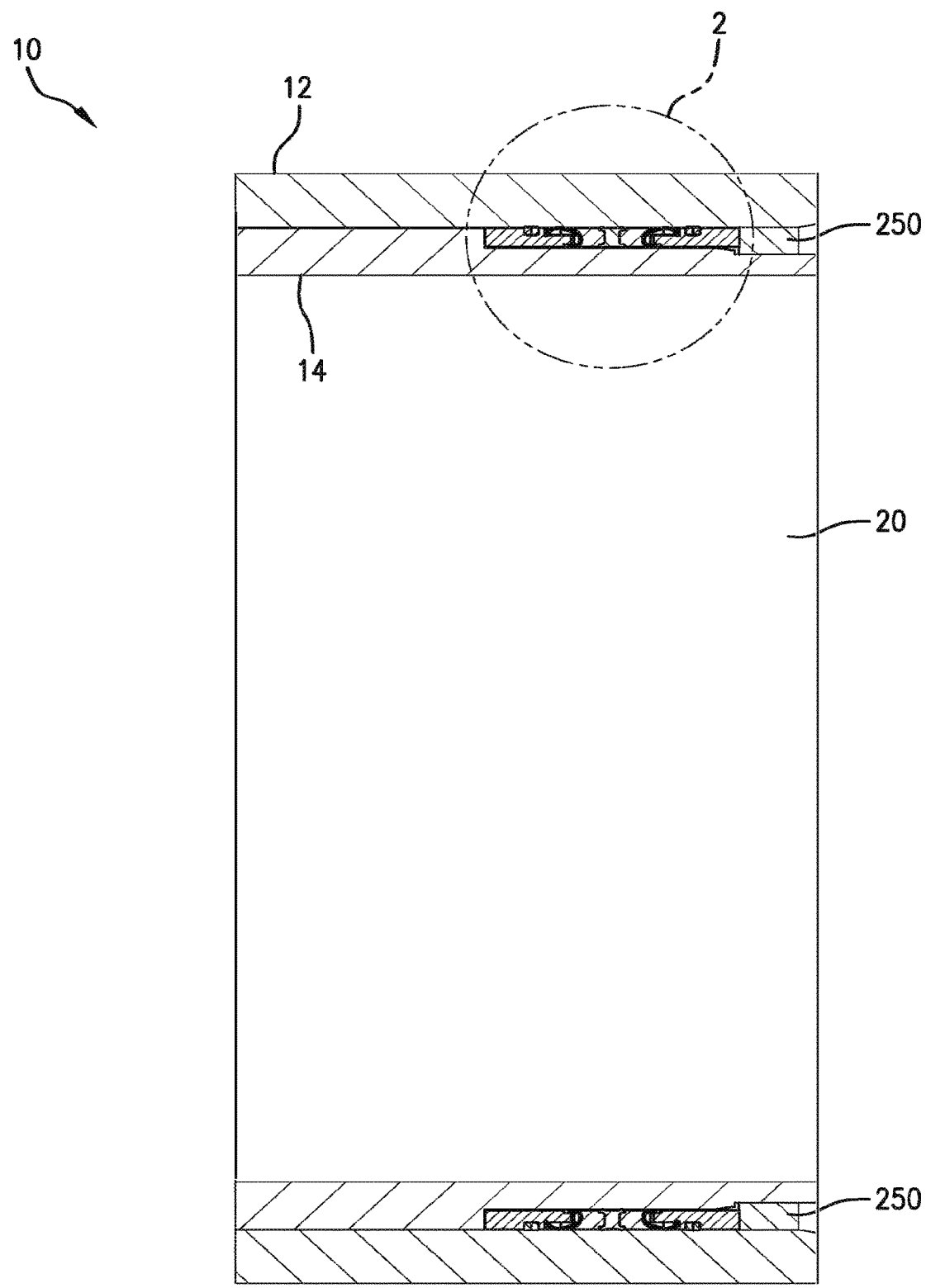
FIG. 1A is a cross-sectional view of the high-pressure bi-directional sealing system in accordance with one embodiment of the present invention.
Figure 2:
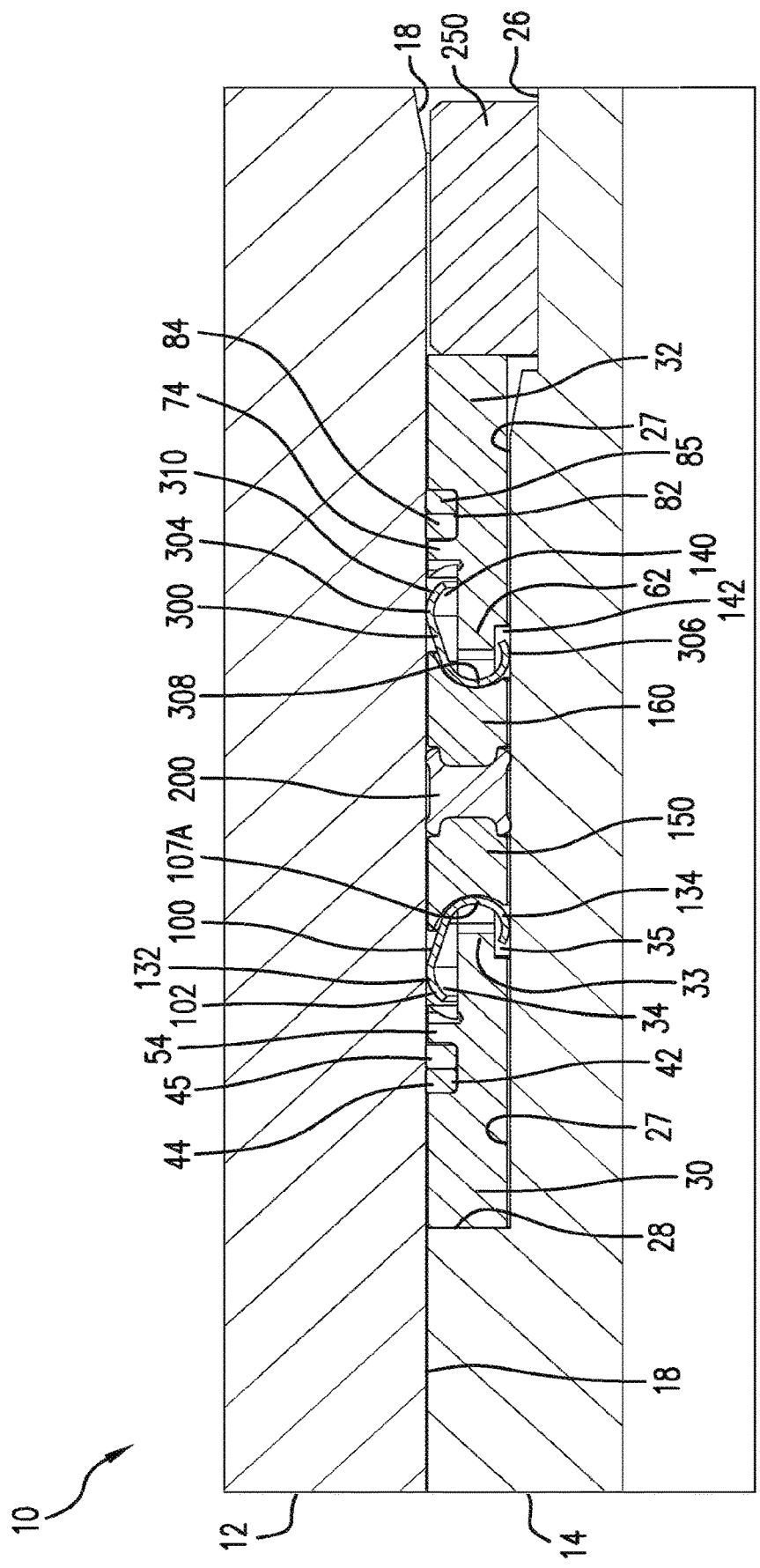
FIG. 2 is an enlarged view of a portion of the view shown in FIG. 1A.

Referring to FIGS. 1A, 1B, and 2, there is shown a high-pressure bi-directional sealing system 10 in accordance with one embodiment of the present invention. Sealing system 10 generally comprises an outer or female tube 12 and an inner or male tube 14. Outer tube 12 and inner tube 14 are both cylindrical in shape and have circular cross-sections. The inner tube 14 is telescopically disposed within outer tube 12. Inner tube 14 and outer tube 12 can move axially with respect to each other. This feature allows the overall length of the sealing system 10 to be increased or decreased which would be beneficial in situations where the sealing system 10 is retrofitted to existing tube networks. The outer tube 12 and inner tube 14 can rotate with respect to each other if an angular force is applied to either outer tube 12 or inner tube 14. The outer tube 12 and inner tube 14 are configured to function as a conduit for flowing matter. The outer tube 12 has an interior region in which inner tube 14 is disposed. Outer tube 12 has an interior surface 18 that surrounds the interior region of outer tube 12. The inner tube 14 has an interior region 20 that is surrounded by interior surface 24. The inner tube 14 includes exterior surface 26 that confronts the interior surface 18 of outer tube 12. Inner tube 14 is configured to have a portion having a first outer diameter D1 and another portion having a second outer diameter D2 that is less than the first diameter D1. The difference in diameters D1 and D2 form a circumferentially extending shoulder 27 and a circumferentially extending wall 28 that is contiguous with shoulder 27. Shoulder 27 is a portion of exterior surface 26. The difference in diameters D1 and D2 also form a circumferentially extending space or spatial region in which the components of the sealing system 10 are located. Outer tube 12 and inner tube 14 are fabricated from metal or metal alloys, e.g. steel, stainless steel, iron, copper, brass, nickel, nickel alloys, titanium, etc.

Figure 4:
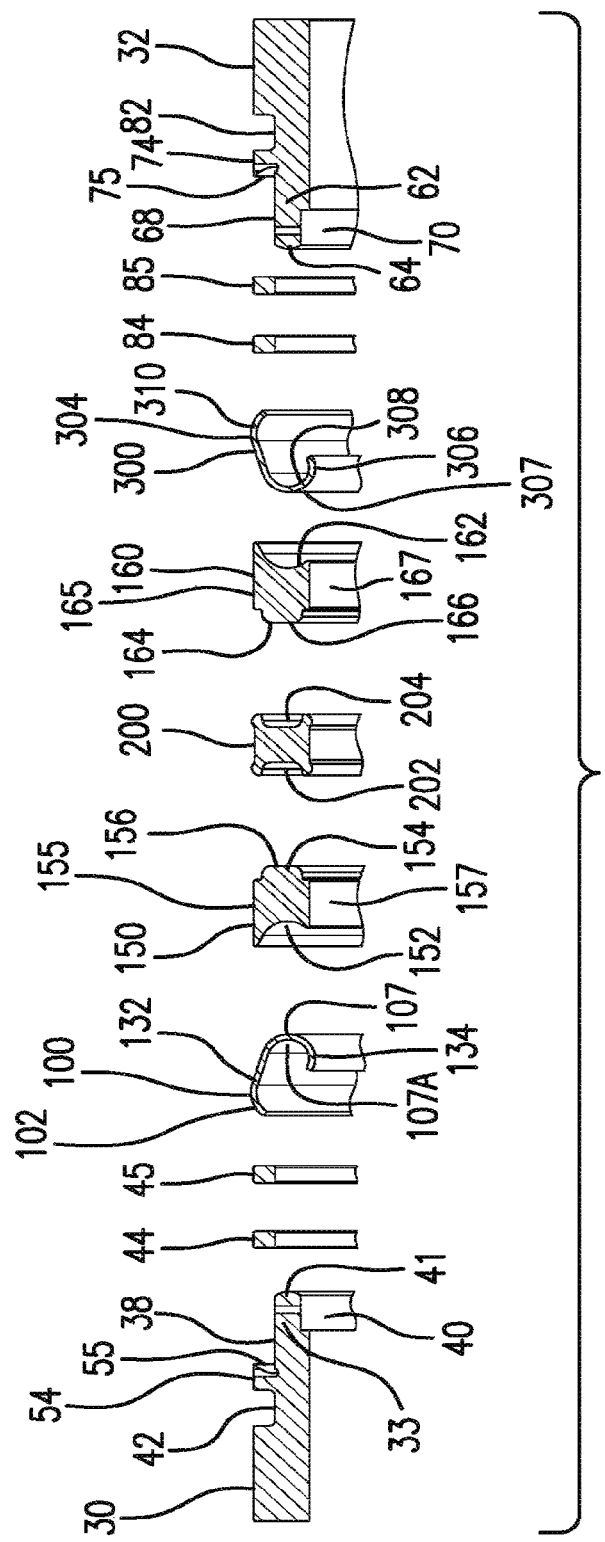
FIG. 4 is an exploded view showing components of the high-pressure bi-directional sealing system.

Referring to FIGS. 1B and 2, sealing assembly 10 further comprises a pair of identically constructed, circumferentially extending outer support rings 30 and 32 that are spaced apart and are positioned within the space or spatial region created by the difference in diameters D1 and D2. Outer support rings 30 and 32 are not fixed to either the interior surface 18 or shoulder 27, but instead are positioned within the space or spatial region created by the difference in diameters D1 and D2. Such a positioning or placement of the outer support rings 30 and 32 is referred to as "floating placement". Outer support ring 30 abuts wall 28 (see FIG. 2). Outer support ring 30 comprises a seal support section 33 that has a structure and shape that forms a space 34 between the seal support section 33 and the interior surface 18 of the outer tube 12 and a second space 35 between the seal support section 33 and shoulder 27. Seal support section 33 has a first side 38 and a second side 40 (see FIG. 4). Seal support section 33 has a rounded end 41. Seal support section 33 functions as a probe and supports the curved inner surface 107A of circumferentially extending seal 100. As shown in FIG. 4, the rounded end 41 of seal support section 33 contacts the curved inner surface 107A of seal 100. Seal support section 33 allows the seal 100 to retain its shape and function as intended under extreme pressure conditions. Seal 100 is described in detail in the ensuing description. Outer support ring 30 includes a circumferentially extending support structure 54 that is adjacent to first side 38. Support structure 54 supports the dynamic portion 132 of the seal 100. As shown in FIG. 4, support structure 54 includes a portion 55 that has a curvature that corresponds to the curvature of end portion 102 of seal 100. End portion 102 abuts support structure 54. Since portions of the seal 100 will be unsupported and under pressure during the dynamic movement, support structure 54 and portion 55 prevent this pressure from distorting and damaging the seal 100. In one embodiment, outer support ring 30 further includes circumferentially extending channel 42 and circumferentially extending piston ring wipers 44 and 45 that are disposed in the channel 42. Wipers 44 and 45 contact interior surface 18 of outer tube 12. As outer tube 12 moves relative to the inner tube 14, or as inner tube 14 moves relative to outer tube 12, wipers 44 and 45 scrape interior surface 18. Wipers 44 and 45 function as mechanical scrapers and wipe away exhaust gas, fluids or other residue and contaminants thereby preventing contamination of the sealing system and damage to seal 100. Wipers 44 and 45 create a clean surface for the seal 100 to seal against. In one embodiment, each wiper 44 and 45 is configured as a Scarf-cut glass-filled PEEK piston ring. However, it is to be understood that other types of mechanical wiping systems can be used in place of wipers 44 and 45, such as wiper seals, O-rings, etc.

Similarly, outer support ring 32 has a seal support section 62 that has a structure and shape that forms a first space or spatial region 140 between the seal support section 62 and the interior surface 18 of the outer tube 12 and a second space or spatial region 142 between the seal support section 62 and shoulder 27. Seal support section 62 has a first side 68 and a second side 70 (see FIG. 4). Seal support section 62 functions as a probe and supports the curved inner surface 308 of the circumferentially extending seal 300. As shown in FIG. 2, seal support section 62 has a rounded end 64 which contacts or abuts curved inner surface 308 of seal 300. Seal support section 62 allows the seal 300 to retain its shape and function as intended under extreme pressure conditions. Seal 300 is described in detail in the ensuing description. Outer support ring 32 includes a circumferentially extending support structure 74 that is adjacent to first side 68. Support structure 74 supports the dynamic portion 304 of the seal 300. Specifically, as shown in FIGS. 2 and 4, support structure 74 has a portion 75 that has a curvature that corresponds to the curvature of end portion 310 of seal 300. End portion 310 of seal 300 abuts portion 75. Since portions of the seal 300 will be unsupported and under pressure during the dynamic movement, support structure 74 and portion 75 prevent this pressure from distorting and damaging the seal 300. In one embodiment, outer support ring 32 further comprises circumferentially extending channel 82 and circumferentially extending piston ring wipers 84 and 85 that are disposed in the channel 82. Wipers 84 and 85 contact interior surface 18 of outer tube 12. As outer tube 12 moves relative to the inner tube 14, or as inner tube 14 moves relative to outer tube 12, wipers 84 and 85 scrape interior surface 18 of outer tube 12. Wipers 84 and 85 function as mechanical scrapers that wipes away exhaust gas, fluids or other residue and contaminants thereby preventing contamination of the sealing system and damage to seal 300. Wipers 84 and 85 create a clean surface for the seal 300 to seal against. In one embodiment, each wiper 84 and 85 is configured as a Scarf-cut glass-filled PEEK piston ring. However, it is to be understood that other types of mechanical wiping systems can be used in place of wipers 84 and 85, such as wiper seals, O-rings, etc.

Referring to FIGS. 2, 3A, 3B, 3C and 4, the sealing system 10 further comprises annular, axial seals 100 and 300 which were briefly described in the foregoing description. Seals 100 and 300 circumferentially extend about inner tube 14. Seals 100 and 300 are oriented in opposite directions. Specifically, the opening of seal 100 is facing in a direction that is opposite to the direction in which the opening of seal 300 is facing. This configuration allows sealing system 10 to handle pressure in both directions. Each seal 100 and 300 is configured as the annular, axial seal shown and described in commonly owned U.S. Pat. No. 6,983,940, issued Jan. 10, 2006 and entitled "Metallic Seal", the disclosure of which patent is hereby incorporated by reference. The aforesaid annular axial seal is also shown and described in commonly owned U.S. Pat. No. 7,201,381, issued Apr. 10, 2007, entitled "Metallic Seal", the disclosure of which patent is hereby incorporated by reference. The aforesaid annular axial seal is also shown and described in commonly owned U.S. Pat. No. 7,789,397, issued Sep. 7, 2010, entitled "Metallic Seal", the disclosure of which patent is hereby incorporated by reference. Seals 100 and 300 are interference fitted within the space or spatial region created by the difference between diameters D1 and D2 of inner tube 14. Seals 100 and 300 are identical in construction and therefore, only seal 100 is discussed in detail. Seal 100 has a generally "j" shaped or hook-shaped cross-section. Seal 100 comprises first end portion 102 which has distal end 104. Distal end 104 defines edge 105. Seal 100 further comprises a generally curled second end portion 106 that includes an arcuate or curved portion 107. Arcuate or curved portion 107 has a curved inner surface 107A. Second end portion 106 extends to distal end 108. Distal end 108 defines edge 110. Seal 100 further comprises central body portion 120 that is between and contiguous with first end portion 102 and second end portion 106. In a preferred embodiment, central body portion 120 has a generally frustroconical shape. In a preferred embodiment, central body portion 120 does not have any inflection points formed therein. Seal 100 has first side 121 and opposite second side 122. Second end portion 106 curls in a first direction 125 in accordance with a predetermined radius of arcuate portion 107 such that distal end 108 is located across from first side 121 by a predetermined distance X1 and distal ends 104 and 108 do not face each other. The dynamic portion of seal 100 is indicated by reference number 132 and the static portion of seal 100 is indicated by reference number 134. As shown in FIG. 2, the seal 100 is positioned such that the dynamic portion 132 is positioned within space or spatial region 34 and bears against interior surface 18 of outer tube 12. The dynamic portion 132 slides against exterior surface 18 if inner tube 14 moves relative to outer tube 12 or contacts interior surface 18 if outer tube 12 moves relative to inner tube 14. The static portion 134 is positioned within the space or spatial region 35 between seal support section 33 and shoulder 27 and bears against shoulder 27. There is no relative motion between static portion 134 and shoulder 27. At all times, seal 100 maintains a seal between interior surface 18 and shoulder 27 as a result of the constant contact between dynamic portion 132 and interior surface 18 and the constant contact between static portion 134 and shoulder 27. As described in the forgoing description, seal 100 is interference fitted within the space or spatial region created by the difference between diameters D1 and D2. Seal 100 is dimensioned so that the forces created by the interference fit are greater on the static portion 134 than the forces on the dynamic portion 132. As described in the foregoing description, seal support section 33 functions as a probe and supports the curved inner surface 107A of seal 100 and support structure 54 supports the dynamic portion 132 of the seal 100. As shown in FIGS. 1B and 2, distal end 104 of first end section 102 abuts and is supported by support structure 54 and portion 55. Since portions of the seal 100 will be unsupported and under pressure during the dynamic movement, support structure 54 prevents this pressure from distorting and damaging the seal 100.

Figure 3A:
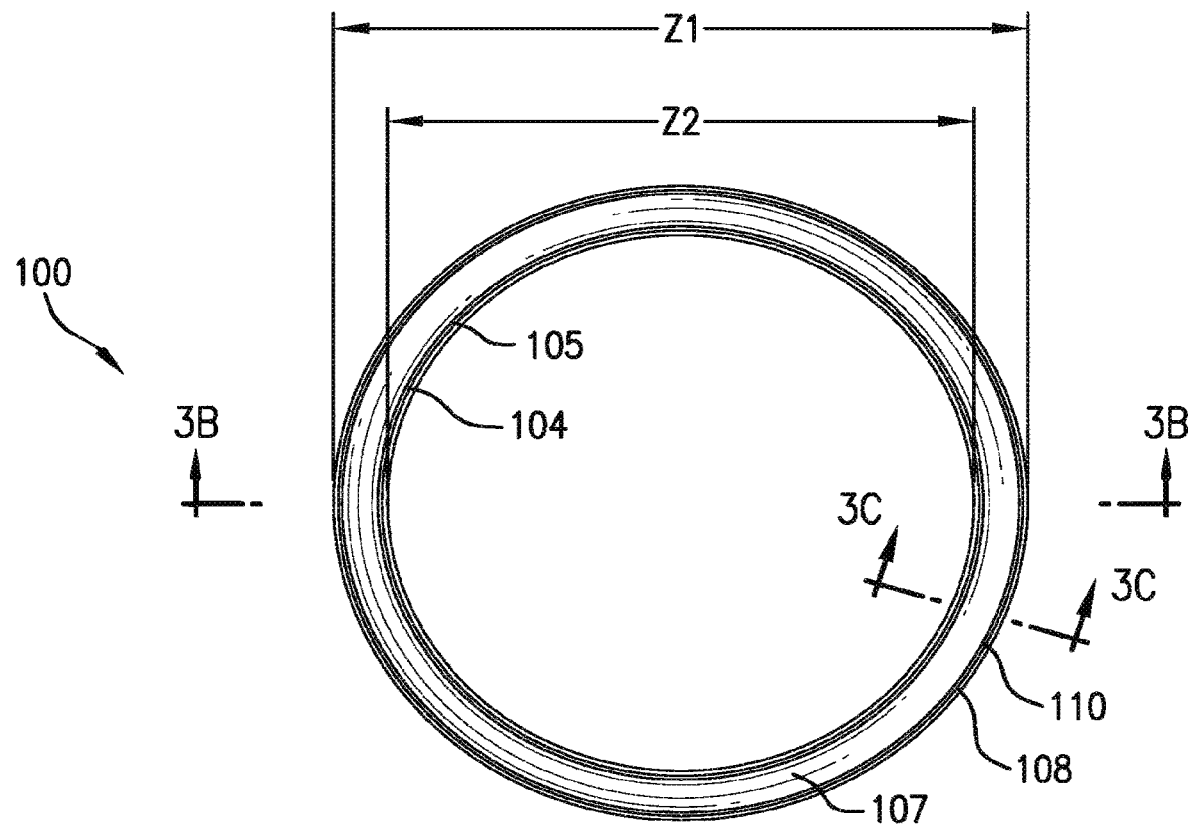
FIG. 3A is a plan view of a seal utilized in the high-pressure bi-directional sealing system.
Figure 3B:
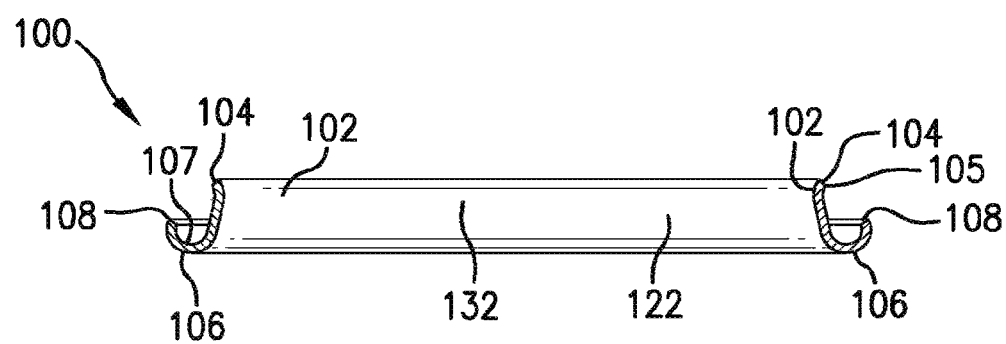
FIG. 3B is a side view, in longitudinal section, taken along line 3B-3B of FIG. 3A.
Figure 3C:
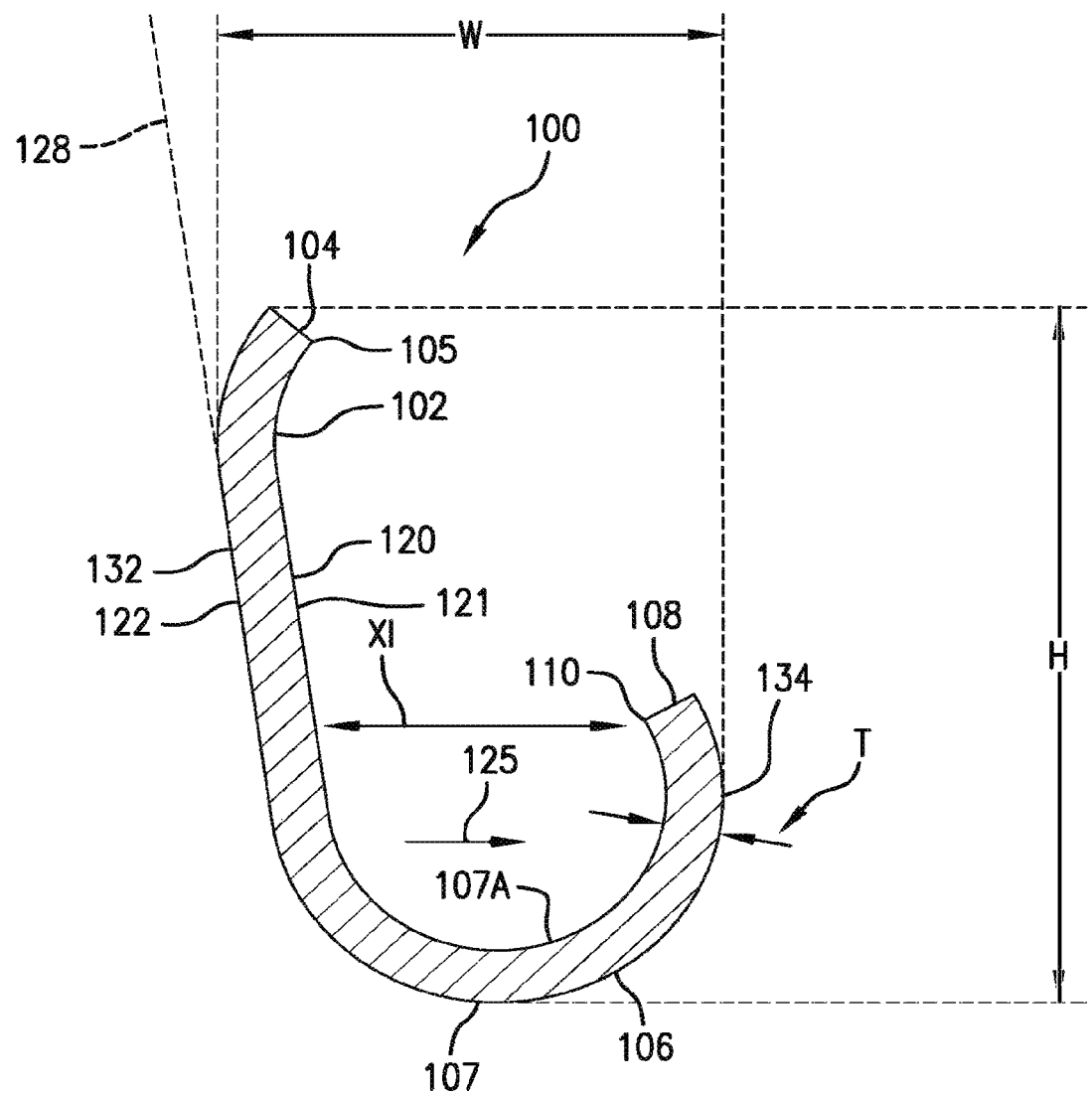
FIG. 3C is a cross-sectional view taken along line 3C-3C of FIG. 3A.

As shown in FIGS. 3A and 3C, seal 100 has outer diameter Z1, inner diameter Z2, thickness T, radial width W, and height H. First end portion 102 is angulated or curved in first direction 125 with respect to dashed reference line 128. The thickness T of seal 100 is uniform throughout the seal, such that central body portion 120 and end portion 102 have the same thickness. The size of seal 100 can be varied in order to be used in different sealing applications. For example, in one embodiment, outer diameter Z1 is about 78.18 mm, inner diameter Z2 is about 70.76 mm, radial width W is about 3.7 mm and height H is about 5.84 mm. It is to be understood that seal 100 can be configured to have other dimensions and that the actual dimensions depend upon the particular application with which the seal will be used. In a preferred embodiment, seal 100 is fabricated from metal or metal alloys. Examples of such metals and metal alloys are nickel, nickel super alloy and nickel cobalt alloys. In a preferred embodiment, seal 100 is solution annealed and age hardened to NACE specifications. In a preferred embodiment, seal 100 has a dicronite coating to reduce installation and operating friction.

Referring to FIGS. 1B, 2 and 4, seal 300 has an arcuate or curved portion 307. Arcuate or curved portion 307 has curved inner surface 308. The dynamic portion of seal 300 is indicated by reference number 304, and the static portion of seal 300 is indicated by reference number 306. Seal 300 further includes end portion 310. Dynamic portion 304 is positioned within the space or spatial region 140 between seal support section 62 and bears against interior surface 18 of outer tube 12. Dynamic portion 304 slides against interior surface 18 when inner tube 14 moves with respect to outer tube 12. Dynamic portion 304 also contacts interior surface 18 when outer tube 12 moves with respect to inner tube 14. Static portion 306 is positioned within the space or spatial region 142 between seal support section 62 and shoulder 27 and bears against shoulder 27. There is no relative motion between static portion 306 and shoulder 27. At all times, seal 300 maintains a seal between interior surface 18 and shoulder 27 as a result of the constant contact between dynamic portion 304 and interior surface 18 and the constant contact between static portion 306 and shoulder 27. Seal support section 62 functions as a probe and supports the curved inner surface 308 of seal 300. As shown in FIGS. 2 and 4, seal support section 62 has a rounded end 64 that contacts the curved inner surface 308 of the seal 300. As described in the foregoing description, circumferentially extending support structure 74 includes a portion 75 that has a curvature that corresponds to the curvature of end portion 310 of seal 300. Support structure 74 supports the dynamic portion 304 of the seal 300. As shown in FIG. 2, end portion 310 abuts portion 75. Since portions of the seal 300 will be unsupported and under pressure during the dynamic movement, support structure 74 and portion 75 prevent this pressure from distorting and damaging the seal 300. As described in the forgoing description, seal 300 is interference-fitted within the space or spatial region created by the difference in diameters D1 and D2. Seal 300 is dimensioned so that the forces created by the interference fit are greater on the static portion 306 than the forces on the dynamic portion 304.

Referring to FIGS. 1B, 2 and 4, the sealing system 10 of the present invention further comprises a pair of circumferentially extending inner support rings 150 and 160 that are positioned via floating placement within the space or spatial region created by the difference in diameters D1 and D2 of inner tube 14. Thus, inner support rings 150 and 160 are not fixed to interior surface 18 or shoulder 27. Inner support rings 150 and 160 are identically constructed. Inner support rings 150 and 160 are separated by a circumferentially extending, center shock absorbing redundant seal 200 which is discussed in detail in the ensuing description. Inner support ring 150 has a side 152 and opposite side 154. Side 152 is formed with a curvature that is sized and shaped to receive the curled or arcuate portion 107 of the seal 100. Thus, inner support ring 150 aligns itself on arcuate portion 107 of the seal 100. Inner support ring 150 includes side 155 that confronts interior surface 18 of outer tube 12. There is relative motion between side 155 and interior side 18. Side 154 is formed with a bulge portion 156 that extends for the entire circumference of inner support ring 150. Bulge portion 156 is received by a complementary shaped contour in sidewall 202 of center redundant shock absorbing seal 200. Inner support ring 150 also includes side 157 that confronts shoulder 27. There is no relative motion between side 157 and shoulder 27. Inner support ring 150 allows the seal 100 to retain its shape and function as intended under extreme pressure conditions. Bulge portion 156 activates the center redundant shock absorbing seal 200 when system pressure is applied. In a preferred embodiment, inner support ring 150 is fabricated from metal or metal alloys.

Referring to FIGS. 1, 2 and 4, inner support ring 160 has side 162 and opposite side 164. Side 162 is formed with a curvature that is shaped and sized to receive the arcuate or curved portion 307 of the seal 300. Thus, inner support ring 160 aligns itself on arcuate portion 307 of the seal 300. Opposite side 164 is formed with a bulge portion 166 that extends for the entire circumference of inner support ring 160. Bulge portion 166 is received by a complementary shaped contour in sidewall 204 of center redundant shock absorbing seal 200. Inner support ring 160 has side 165 that confronts interior surface 18 of outer tube 12. Inner support ring 160 also has side 167 that confronts shoulder 27. There is no relative motion between side 167 and shoulder 27. Inner support ring 160 allows the seal 300 to retain its shape and function as intended under extreme pressure conditions. Bulge portion 166 activates center redundant shock absorbing seal 200 when system pressure is applied. In a preferred embodiment, inner support ring 160 is fabricated from metal or metal alloys.

Referring to FIGS. 1, 2 and 4, circumferentially extending center shock absorbing redundant seal 200 is positioned within the space or spatial region formed by the difference between the diameters D1 and D2. Redundant seal 200 is located between inner support rings 150 and 160. Redundant seal 200 is configured to be interference fitted between shoulder 27 and interior surface 18. Bulge portion 156 of inner support ring 150 is positioned within the complementary shaped contour in sidewall 202 of redundant seal 200. Bulge portion 166 of inner support ring 160 is positioned within the complementary shaped contour in sidewall 204 of redundant seal 200. Seal 200 has a generally "X" shaped cross-section. Bulge portions 156 and 166 of inner support rings 150 and 160, respectively, activate redundant seal 200 under system pressure. Specifically, when sealing system 10 undergoes pressure, bulge portions 156 and 166 are pressed into sidewalls 202 and 204, respectively, which causes the seal 200 to bear against interior surface 18 and shoulder 27 with even greater force so as to maintain a seal. Redundant seal 200 functions as a fail-safe seal in the event of failure of seal 100 and/or seal 300. In a preferred embodiment, redundant seal 200 is fabricated from glass-filled PEEK.

Referring to FIGS. 1B and 2, sealing system 10 further comprises circumferentially extending retaining member 250 that is attached to inner tube 14. Outer support rings 30 and 32, seals 100 and 300, inner support rings 150 and 160 and redundant seal 200 are firmly positioned between wall 28 and retaining member 250. Retaining member 250 prevents these components from becoming dislodged from the space or spatial region between shoulder 27 and interior surface 18. In one embodiment, retaining member 250 is a nut that is screwed onto threads (not shown) on inner tube 14.

In an alternate embodiment, redundant seal 200 is energized or activated via mechanical displacement that forces inner support rings 150 and 160 into redundant seal 200.

Figure 5:
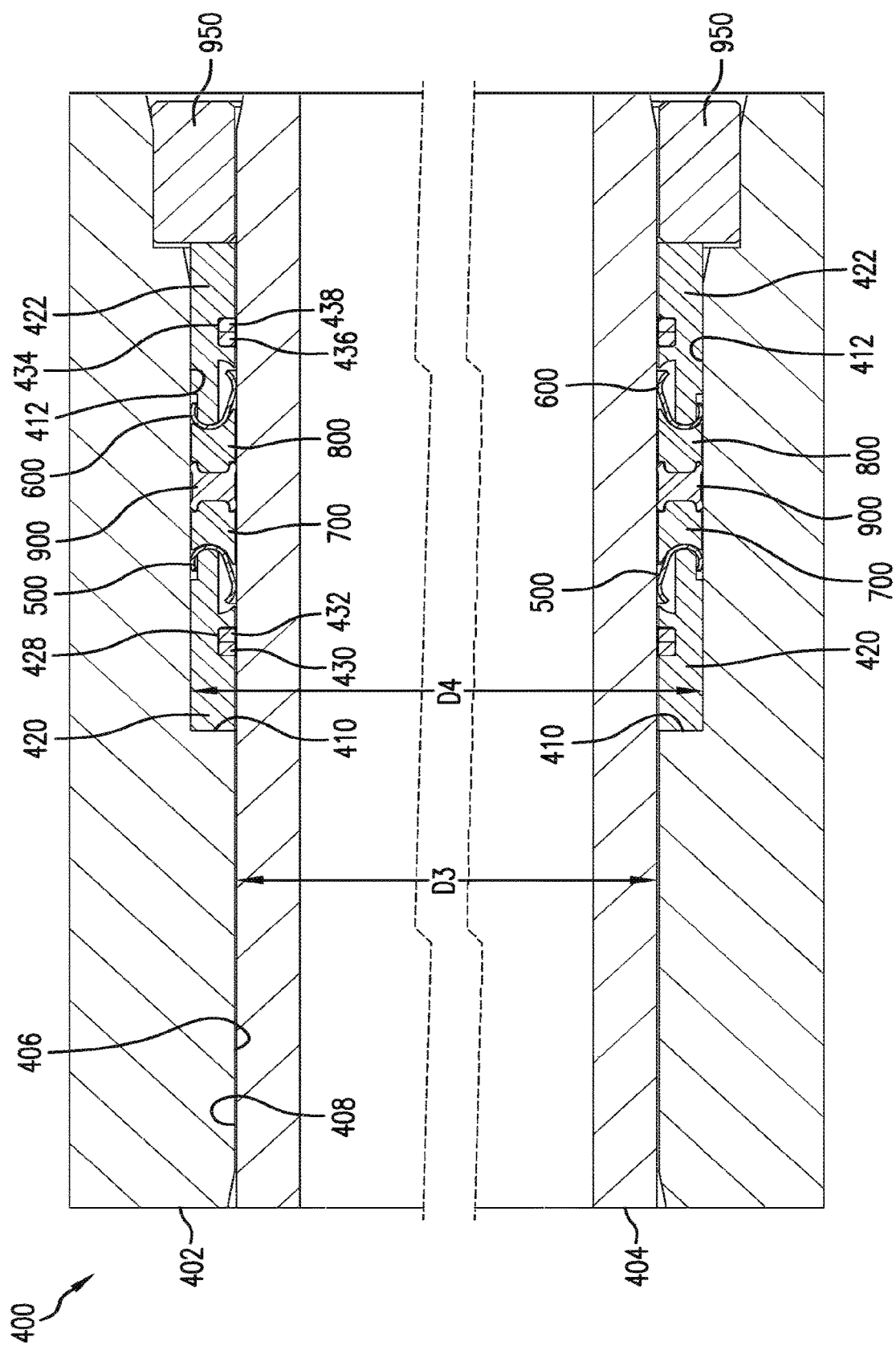
FIG. 5 is a cross-sectional view of a high-pressure bi-directional sealing system in accordance with another embodiment of the present invention.
Figure 6:
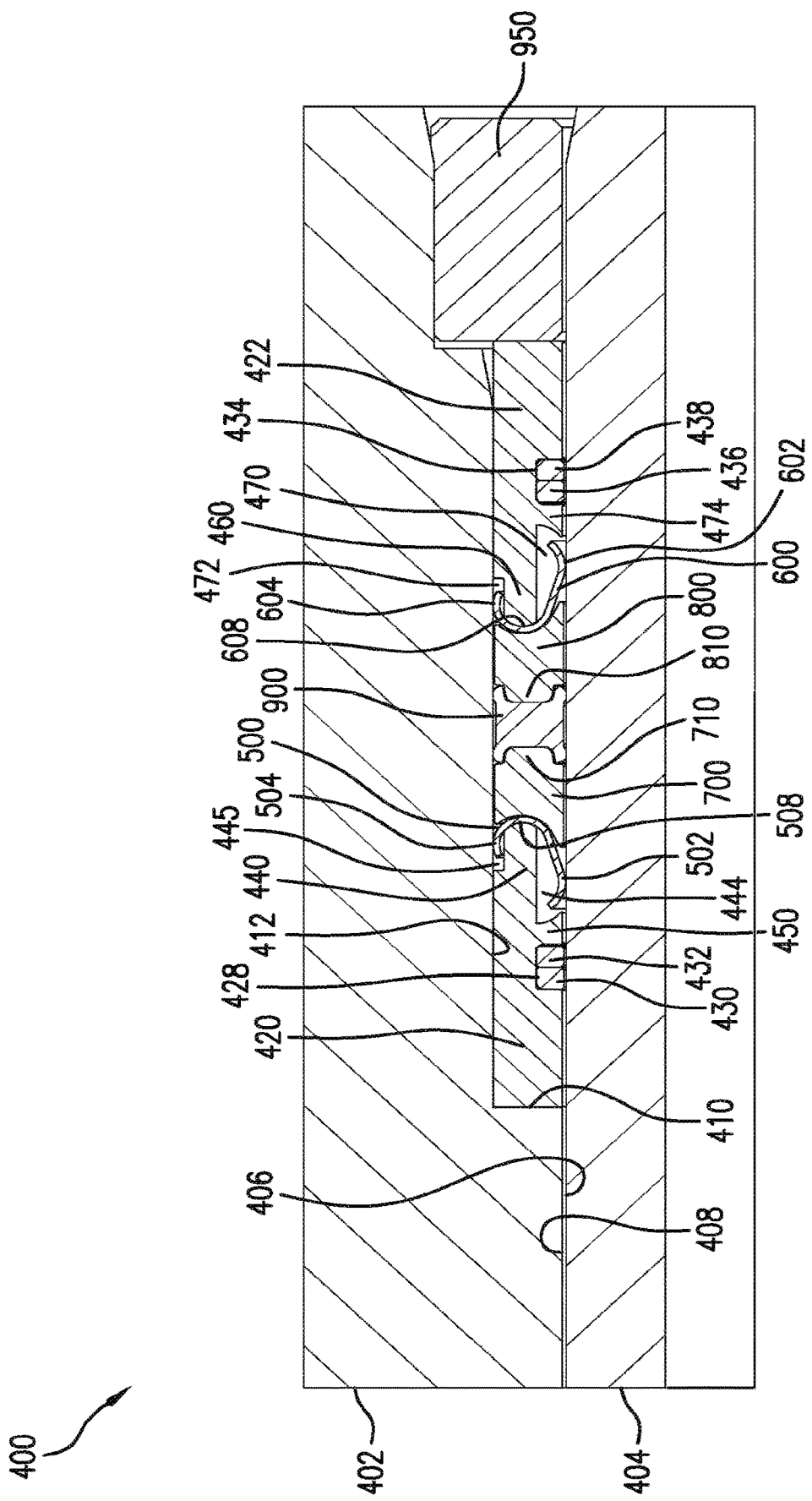
FIG. 6 is an enlarged view of a portion of the view shown in FIG. 5.
Figure 7:
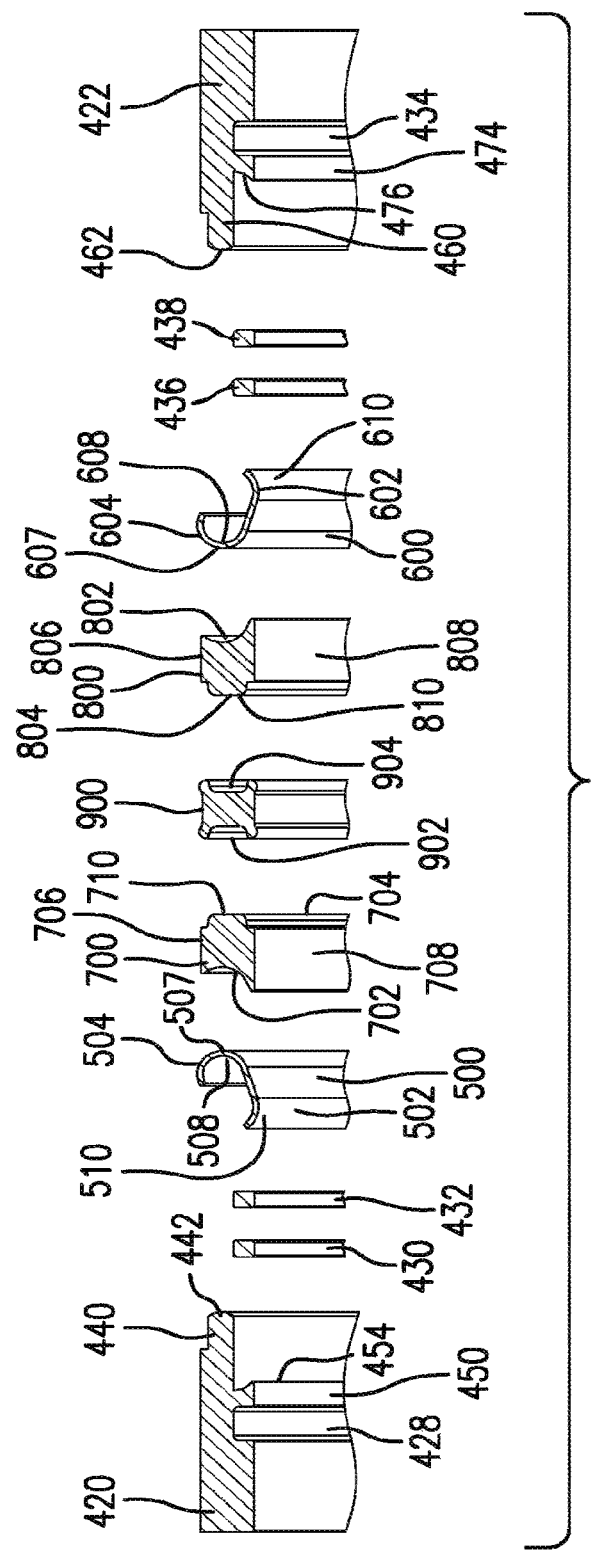
FIG. 7 is an exploded view showing components of the high-pressure bi-directional sealing system of FIG. 5.

Referring to FIGS. 5-7, there is shown a high pressure, bi-directional sealing system 400 in accordance with an alternate embodiment of the invention. Sealing system 400 comprises outer or female tube 402 and inner or male tube 404. Inner tube 404 is telescopically disposed within the interior region of outer tube 402. Outer tube 402 and inner tube 404 are fabricated from metal or metal alloys, e.g. steel, stainless steel, iron, copper, brass, nickel, nickel alloys, titanium, etc. Outer tube 402 and inner tube 404 can move axially or radially with respect to each other. Outer tube 402 has interior surface 406. Inner tube 404 has exterior surface 408. Outer tube 402 is configured to have a portion that has a first inner diameter D3 and another portion that has a second inner diameter D4 that is greater than the first inner diameter D3. This difference in diameters D3 and D4 forms circumferentially extending wall 410 and circumferentially extending shoulder 412 that is contiguous with wall 410. Shoulder 412 is a portion of interior surface 406. The difference in diameters D3 and D4 forms a circumferentially extending space or spatial region between exterior surface 408 and shoulder 412 in which the components of the sealing system are located. Sealing system 400 uses the same components as sealing system 10 except that in this embodiment, both annular, axial seals are oriented in different positions. Sealing system 400 further comprises a pair of circumferentially extending outer support rings 420 and 422 that are located via floating placement within the space or spatial region between exterior surface 408 and shoulder 412. Outer support rings 420 and 422 perform the same function and have the same structure as outer support rings 30 and 32, respectively, which were described in the foregoing description. Outer support ring 420 abuts wall 410. Outer support ring 420 has a circumferentially extending channel 428 and circumferentially extending piston ring wipers 430 and 432 that are disposed within the channel 428. Wipers 430 and 432 have the same structure as wipers 44 and 45, respectively (see FIG. 2). Similarly, outer support ring 422 has a circumferentially extending channel 434 and circumferentially extending piston ring wipers 436 and 438 that are disposed within the channel 434. Wipers 430, 432, 436 and 438 perform a scraping function on exterior surface 408 so to remove exhaust gas, fluids or other residue and contaminants thereby preventing contamination of the sealing system. Outer support ring 420 comprises a seal support section 440 which functions as a probe and supports the curved inner surface 508 of the corresponding seal 500. Specifically, seal support section 440 includes rounded end 442 that contacts and supports the curved inner surface 508. Thus, the function of seal support section 440 is the same as seal support section 33 (see FIG. 2). Seal support section 440 has a structure and shape that forms a first space or spatial region 444 that is between seal support structure 440 and exterior surface 408, and a second space or spatial region 445 that is between seal support structure 440 and shoulder 412. Circumferentially extending seal 500 is an annular axial seal and has the same structure and function as seal 100 (see FIG. 2) which was described in the foregoing description. The dynamic portion of seal 500 is indicated by reference number 502 and the static portion of seal 500 is indicated by reference number 504. The dynamic portion 502 of the seal 500 is positioned in the space or spatial region 444, and the static portion 504 of the seal 500 is positioned in the space or spatial region 445. Seal 500 includes arcuate or curved portion 507 which has curved inner surface 508. Seal 500 includes end portion 510 which has a curvature therein.

As shown in FIGS. 6 and 7, outer support ring 420 includes a circumferentially extending support structure 450 that supports the dynamic portion 502 of the seal 500. Support structure 450 includes portion 454 which has a curvature that corresponds to the curvature of end portion 510 of seal 500. End portion 510 abuts the portion 454 as shown in FIG. 6. The dynamic portion 502 slides or moves upon exterior surface 408 when outer tube 402 moves relative to inner tube 404. The dynamic portion 502 contacts or bears against exterior surface 408 if inner tube 404 moves relative to outer tube 402. There is no relative motion between static portion 504 and shoulder 412. At all times, seal 500 maintains a seal between shoulder 412 and exterior surface 408 as a result of the constant contact between dynamic portion 502 and exterior surface 408 and the constant contact between static portion 504 and shoulder 412.

As shown in FIGS. 6 and 7, circumferentially extending seal 600 includes arcuate or curved portion 607 which has curved inner surface 608. Seal 600 includes end portion 610 which has a curvature therein. Outer support ring 422 comprises a seal support section 460 which functions as a probe and supports the curved inner surface 608 of seal 600. Seal support section 460 has a rounded end 462 which contacts the curved inner surface 608. Thus, the function of seal support section 460 is the same as seal support section 62 (see FIG. 2) described in the foregoing description. Seal support section 460 has a shape and structure that forms a space or spatial region 470 between seal support section 460 and exterior surface 408, and a space or spatial region 472 between seal support section 460 and shoulder 412. Seal 600 is an annular axial seal and has the same structure and function as seal 300 (see FIG. 2) which was described in the foregoing description. The dynamic portion of seal 600 is indicated by reference number 602 and the static portion of seal 600 is indicated by reference number 604. The dynamic portion 602 is positioned in space or spatial region 470 and the static portion 604 is positioned in the space or spatial region 472. Outer support ring 422 includes a circumferentially extending support structure 474 that supports the dynamic portion 602 of the seal 600. Support structure 474 includes portion 476 that has a curvature that corresponds to the curvature of end portion 610 of seal 600. End portion 610 abuts the portion 476 as shown in FIG. 6. The dynamic portion 602 slides or moves upon exterior surface 408 when outer tube 402 moves relative to inner tube 404. The dynamic portion 602 contacts or bears against exterior surface 408 if inner tube 404 moves relative to outer tube 402. There is no relative motion between static portion 604 and shoulder 412. At all times, seal 600 maintains a seal between exterior surface 408 and shoulder 412 as a result of the constant contact between dynamic portion 602 and exterior surface 408 and the constant contact between static portion 604 and shoulder 412.

Referring to FIGS. 5-7, sealing system 400 further comprises a pair of circumferentially extending inner support rings 700 and 800 that are positioned via floating placement within the space or spatial region between shoulder 412 and exterior surface 408. Inner support rings 700 and 800 are identically constructed. Inner support rings 700 and 800 have the same structure and function as inner support rings 150 and 160, respectively (see FIGS. 1B and 2). Inner support rings 700 and 800 are separated by a circumferentially extending, center shock absorbing redundant seal 900 which is discussed in detail in the ensuing description. Inner support ring 700 has side 702 and opposite side 704. Side 702 is formed with a curvature that is shaped and sized to receive the curled or arcuate portion 507 of the seal 500. Inner support ring 700 has side 706 that confronts shoulder 412. There is no relative motion between side 706 and shoulder 412. Inner support ring 700 also has side 708 that confronts exterior surface 408 of inner tube 404. There is relative motion between side 708 and exterior surface 408. Side 704 has a bulge portion 710 that is shaped and sized to fit into a complementary contour in sidewall 902 of center redundant shock absorbing seal 900. Inner support ring 700 allows the seal 500 to retain its shape and function as intended under extreme pressure conditions. Bulge portion 710 activates the center redundant shock absorbing seal 900 when system pressure is applied. In a preferred embodiment, inner support ring 700 is fabricated from metal or metal alloys.

As shown in FIGS. 6 and 7, inner support ring 800 has side 802 and opposite side 804. Side 802 has a curvature that is sized and shaped to receive the curled or arcuate portion 607 of the seal 600. Inner support ring 800 has side 806 that confronts shoulder 412. There is no relative motion between side 806 and shoulder 412. Inner support ring 800 also has side 808 that confronts exterior surface 408 of inner tube 404. There is relative motion between side 808 and exterior surface 408. Side 804 has a bulge portion 810 that extends for the entire circumference of inner support ring 800. Bulge portion 810 has a shape and size that fits the complementary shaped sidewall 904 of center redundant shock absorbing seal 900. Inner support ring 800 allows the seal 600 to retain its shape and function as intended under extreme pressure conditions. Bulge portion 810 activates the center redundant shock absorbing seal 900 when system pressure is applied. In a preferred embodiment, inner support ring 800 is fabricated from metal or metal alloys.

Referring to FIGS. 5-7, circumferentially extending center shock absorbing redundant seal 900 is interference-fitted between inner support rings 700 and 800 and interference fitted between exterior surface 408 and shoulder 412. Bulge portion 710 of inner support ring 700 is positioned within the complementary shaped sidewall 902 of redundant seal 900 and bulge portion 810 of inner support ring 800 is positioned within the complementary shaped sidewall 904 of redundant seal 900. Seal 900 has a generally "X" shaped cross-section. Bulge portions 710 and 810 of inner support rings 700 and 800, respectively, activate redundant seal 900 under system pressure. Redundant seal 900 functions as a fail-safe seal in the event of failure of seal 500 and/or seal 600. In a preferred embodiment, redundant seal 900 is fabricated from glass-filled PEEK.

Referring to FIGS. 5 and 6, sealing system 400 further comprises circumferentially extending retaining member 950. Outer support ring 422 abuts retaining member 950. Outer support rings 420 and 422, seals 500 and 600, inner support rings 700 and 800 and redundant seal 900 are firmly positioned between wall 410 and retaining member 950. Retaining member 950 prevents these components from becoming dislodged from the space or spatial region between exterior surface 408 and shoulder 412. In one embodiment, retaining member 950 is a nut that is screwed onto threads (not shown) on outer tube 402.

As shown in FIGS. 5 and 6, seals 500 and 600 are oriented in opposite directions. Specifically, the opening of seal 500 is facing in a direction that is opposite to the direction in which the opening of seal 600 is facing. This configuration allows sealing system 400 to handle pressure in both directions.

In an alternate embodiment, redundant seal 900 is energized or activated via mechanical displacement that forces inner support rings 700 and 800 into redundant seal 900.

The sealing function provided by the sealing system of the present invention is maintained whether the inner male tube moves axially or radially (i.e. rotation) with respect to the outer female tube and vice versa. Thus, sealing systems 10 and 400 provide a high-integrity seal between the outer female tube and inner male tube which prevents leakage of flowing matter flowing through the outer female tube and inner male tube. The sealing system of the present invention allows for misalignments of dynamic and/or static displacements. The ability of the outer female tube and inner male tube to move axially and radially with respect to each other allows for expansion and movement resulting from temperature changes, mechanical vibrations and shocks or sudden impacts, and also facilitates removal or installation of the sealing system. The sealing system of the present invention can operate under pressures between 10,000 and 20,000 PSI at 300° F. The sealing system of the present invention can be used in low or high humidity environments, at high altitudes or below sea level, with caustic fluids as well as alkaline fluids, in low viscosity or high viscosity conditions, and with low-pressure fluids or high-pressure fluids.

Figure 8:
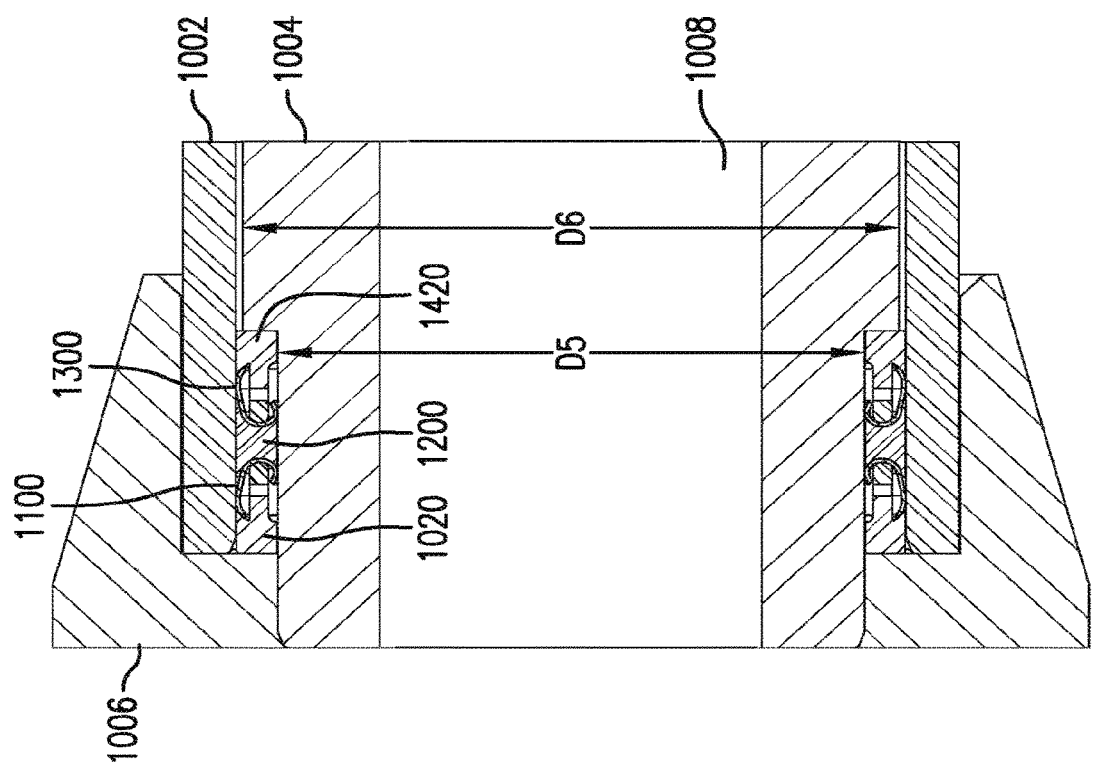
FIG. 8 is a cross-sectional view of a high-pressure bi-directional sealing system in accordance with further embodiment of the invention.
Figure 9:
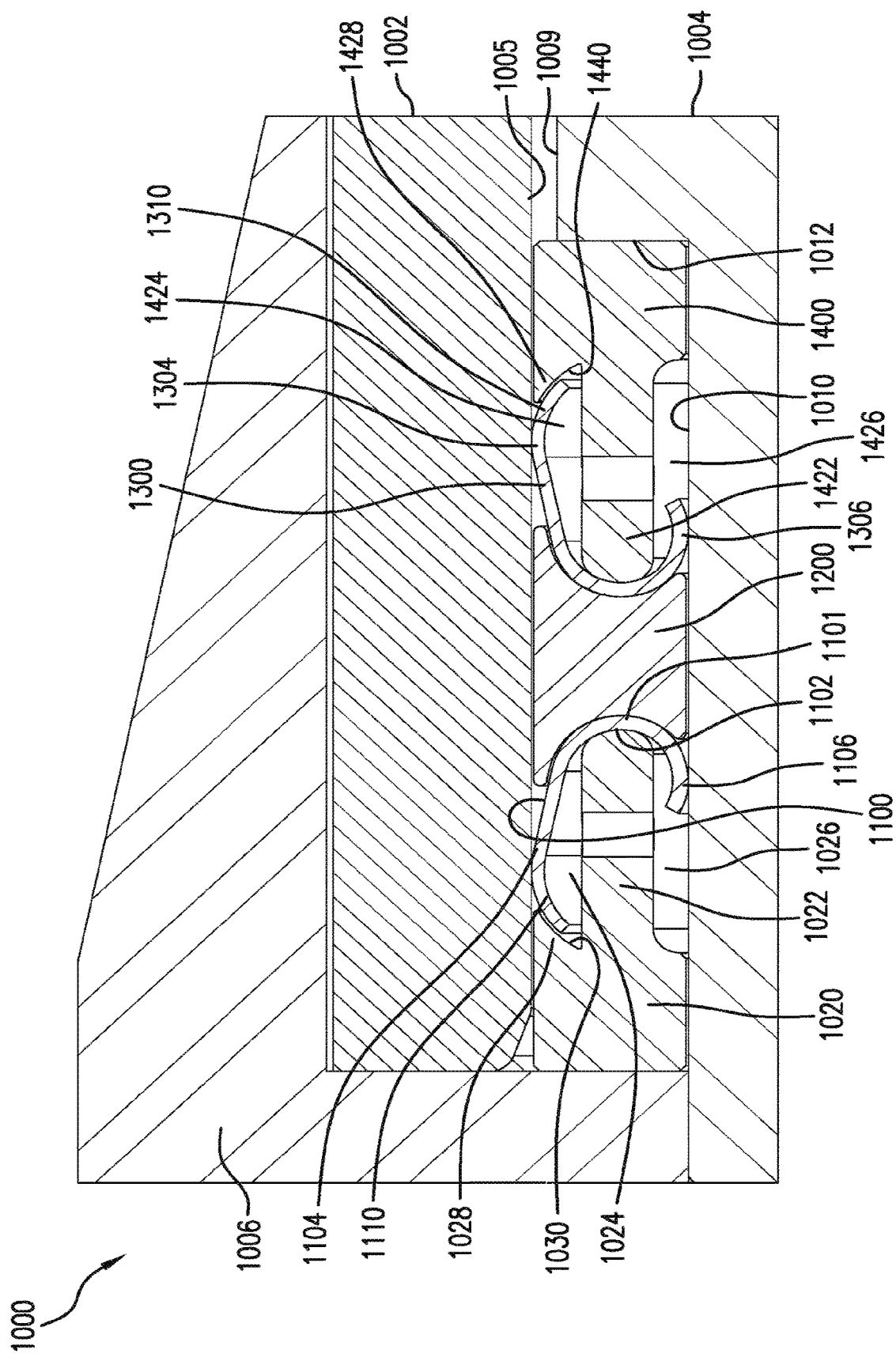
FIG. 9 is an enlarged view of a portion of the view shown in FIG. 8.
Figure 10:
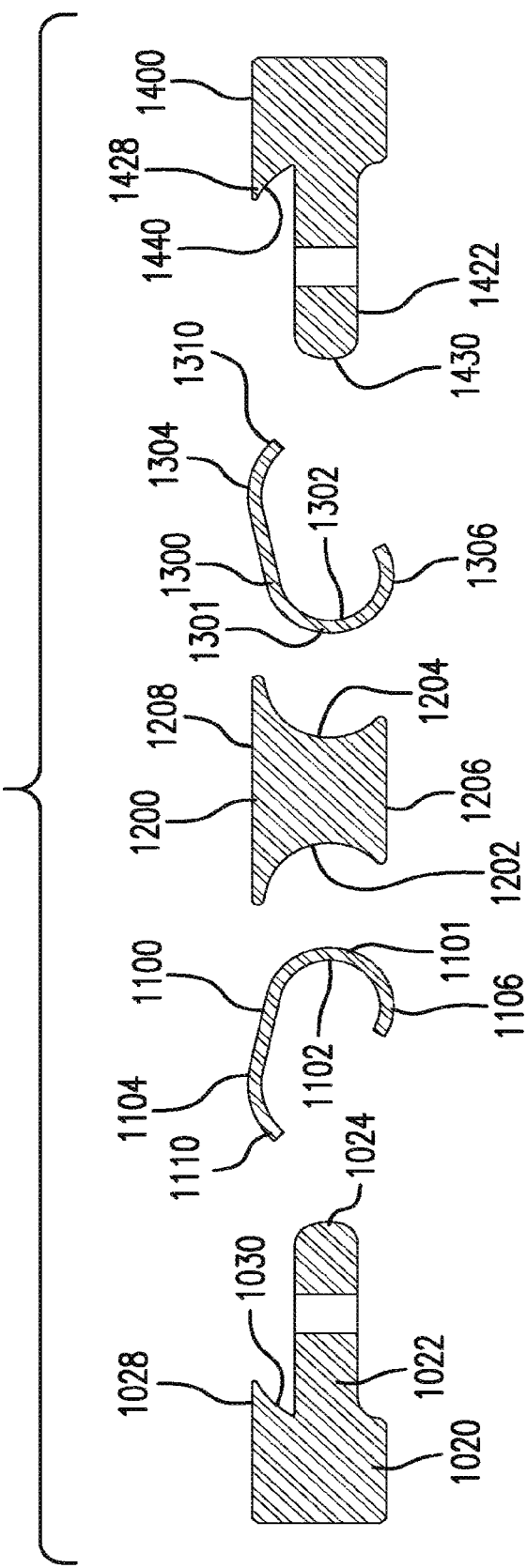
FIG. 10 is an exploded view showing components of the high-pressure bi-directional sealing system of FIG. 8.

Referring to FIGS. 8-10, there is shown sealing system 1000 in accordance with another embodiment of the present invention. Sealing system 1000 comprises outer or female tube 1002 and inner or male tube 1004 which is telescopically disposed within outer tube 1002. Circumferentially extending retaining member 1006 is removably attached to inner tube 1004. In one embodiment, retaining member 1006 is screwed onto inner tube 1004 via threads (not shown) on inner tube 1004. The purpose of locking member 1006 will be described in the ensuing description. Outer tube 1002 has an interior surface 1005 (see FIG. 9). Inner tube 1004 has interior region 1008 and an exterior surface 1009. Inner tube 1004 has a portion that has a first outer diameter D5 and a second portion that has a second outer diameter D6 that is greater than the first outer diameter D5. The difference in diameters D5 and D6 forms circumferentially extending shoulder 1010 and circumferentially extending vertical wall 1012 that is contiguous with circumferentially extending shoulder 1010. Shoulder 1010 is a portion of exterior surface 1009 of inner tube 1004. The difference in the diameters D5 and D6 also forms a circumferentially extending space or spatial region that is between shoulder 1010 and interior surface 1005 of outer tube 1002. As will be evident from the ensuing description, components of the sealing system 1000 are located in the aforesaid space or spatial region between shoulder 1010 and interior surface 1005.

Referring to FIGS. 8-10, the sealing system 1000 comprises a circumferentially extending outer support ring 1020 which is positioned between interior surface 1005 and shoulder 1010 via floating placement. Outer support ring 1020 abuts locking member 1006. Outer support ring 1020 comprises a seal support section 1022 which has a shape and structure that forms a first space or spatial region 1024 between seal support section 1022 and interior surface 1005, and a second space or spatial region 1026 between seal support section 1022 and shoulder 1010. Sealing system 1000 further includes circumferentially extending annular, axial seal 1100. Seal 1100 has the same structure and performs the same function as seals 100 and 500 described in the forgoing description. Seal 1100 has an arcuate or curved portion 1101 which has a curved inner surface 1102. Seal support section 1022 functions as a probe and supports the curved inner surface 1102 of seal 1100. Specifically, seal support section 1022 has rounded end 1024 which contacts and supports the curved inner surface 1102 of seal 1100. Outer support ring 1020 further comprises a circumferentially extending support structure 1028 which has a portion 1030 that has a curvature that corresponds to the curvature of end portion 1110 of seal 1100. As shown in FIGS. 9 and 10, the dynamic portion of seal 1100 is indicated by reference number 1104 and the static portion of the seal 1100 is indicated by reference number 1106. The dynamic portion 1104 of seal 1100 is located within space 1024 and the static portion 1106 is located in space 1026. Support structure 1028 supports the dynamic portion 1104 of seal 1100. Specifically, as shown in FIG. 9, end portion 1110 of seal 1100 abuts portion 1030 of support structure 1028. Dynamic portion 1104 bears against interior surface 1005 of outer tube 1002. Dynamic portion 1104 slides against interior surface 1005 when inner tube 1004 moves with respect to outer tube 1002. Dynamic portion 1104 also contacts interior surface 1005 when outer tube 1002 moves with respect to inner tube 1004. Static portion 1106 bears against the shoulder 1010. There is no relative motion between static portion 1106 and shoulder 1010. At all times, seal 1100 maintains a seal between interior surface 1005 and shoulder 1010 as a result of the constant contact between dynamic portion 1104 and interior surface 1005 and the constant contact between static portion 1106 and shoulder 1010.

Referring to FIGS. 9-10, sealing system 1000 further comprises a circumferentially extending inner support ring 1200 that is positioned within the space or spatial region between shoulder 1010 and interior surface 1005 via floating placement. Inner support ring 1200 is positioned between seals 1100 and 1300. Inner support ring 1200 has side 1202 and opposite side 1204. Side 1202 is formed with a curvature that is sized and shaped to receive the curled or arcuate portion 1101 of the seal 1100. Side 1204 is formed with a curvature that is sized and shaped to receive the curled or arcuate portion 1301 of the seal 1300. Thus, inner support ring 1200 aligns itself on arcuate portions 1101 and 1301 of seals 1100 and 1300, respectively. Inner support ring 1200 has side 1206 that confronts shoulder 1010. There is no relative motion between side 1206 and shoulder 1010. Inner support ring 1200 also has side 1208 that confronts interior surface 1005 of outer tube 1002. There may be relative motion between side 1208 and interior surface 1005. Inner support ring 1200 allows the seals 1100 and 1300 to retain their shape and function as intended under extreme pressure conditions. In a preferred embodiment, inner support ring 1200 is fabricated from metal or metal alloys.

Referring to FIGS. 9 and 10, sealing system 1000 further comprises outer support ring 1400 that is positioned between interior surface 1005 and shoulder 1010 via floating placement. Outer support ring 1400 abuts wall 1012 (see FIG. 9). Outer support ring 1400 comprises a seal support section 1422 that has a shape and structure that forms a first space or spatial region 1424 between seal support section 1422 and interior surface 1005, and a second space or spatial region 1426 between seal support section 1422 and shoulder 1010. Seal 1300 is a circumferentially extending annular, axial seal and has the same structure and performs the same function as seals 300 and 600 described in the forgoing description. Seals 1100 and 1300 are oriented in opposite directions. Specifically, the opening of seal 1100 is facing in a direction that is opposite to the direction in which the opening of seal 1300 is facing. This configuration allows sealing system 1000 to handle pressure in both directions. Seal 1300 has a curved or arcuate portion 1301 which has a curved inner surface 1302. Seal support section 1422 functions as a probe and supports the curved inner surface 1302. Specifically, seal support section 1422 has a rounded end 1430 that contacts the curved inner surface 1302 of seal 1300. The dynamic portion of the seal 1300 is indicated by reference number 1304. The static portion of the seal 1300 is indicated by reference number 1306 the dynamic portion 1304 of seal 1300 is located within space 1424 and the static portion 1306 is located in space 1426. Outer support ring 1400 includes circumferentially extending support structure 1428. Support structure 1428 has a portion 1440 that has a curvature that corresponds to the end portion 1310 of seal 1300. End portion 1310 abuts portion 1440 as shown in FIG. 9. Thus, support structure 1428 supports the dynamic portion 1304 of seal 1300. Dynamic portion 1304 bears against interior surface 1005 of outer tube 1002. Dynamic portion 1304 slides against interior surface 1005 when inner tube 1004 moves with respect to outer tube 1002. Dynamic portion 1304 also contacts interior surface 1005 when outer tube 1002 moves with respect to inner tube 1004. Static portion 1306 bears against the shoulder 1010. There is no relative motion between static portion 1306 and shoulder 1010.

Referring to FIG. 9, at all times, seal 1100 maintains a seal between interior surface 1005 and shoulder 1010 as a result of the constant contact between dynamic portion 1104 and interior surface 1005 and the constant contact between static portion 1106 and shoulder 1010. At all times, seal 1300 maintains a seal between interior surface 1005 and shoulder 1010 as a result of the constant contact between dynamic portion 1304 and interior surface 1005 and the constant contact between static portion 1306 and shoulder 1010.

As shown in FIG. 9, outer support ring 1020, seal 1100, inner support ring 1200, seal 1300 and outer support ring 1400 are positioned and retained between retaining member 1006 and wall 1012.

Figure 11:
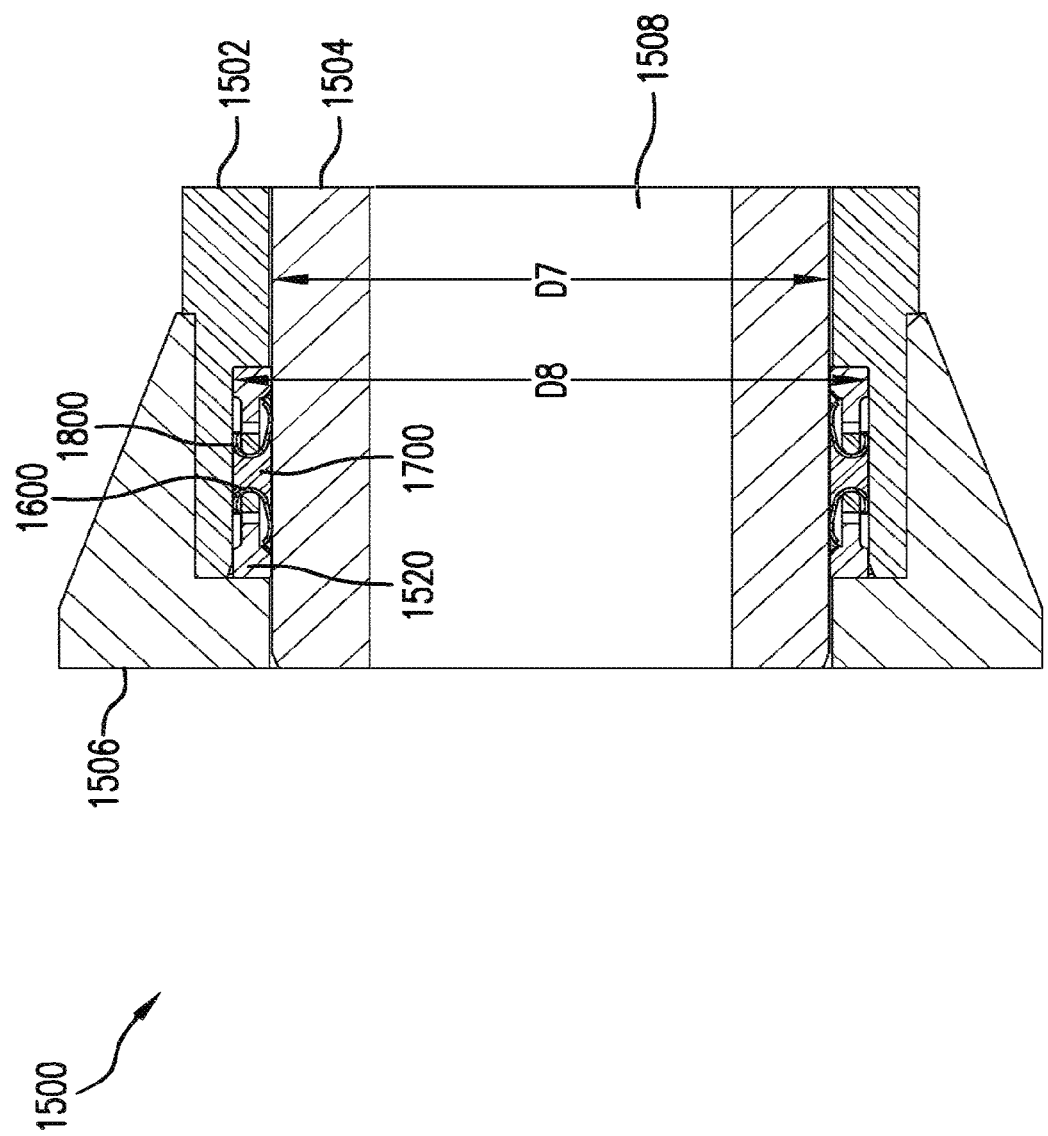
FIG. 11 is a cross-sectional view of a high-pressure bi-directional sealing system in accordance with another embodiment of the invention.
Figure 12:
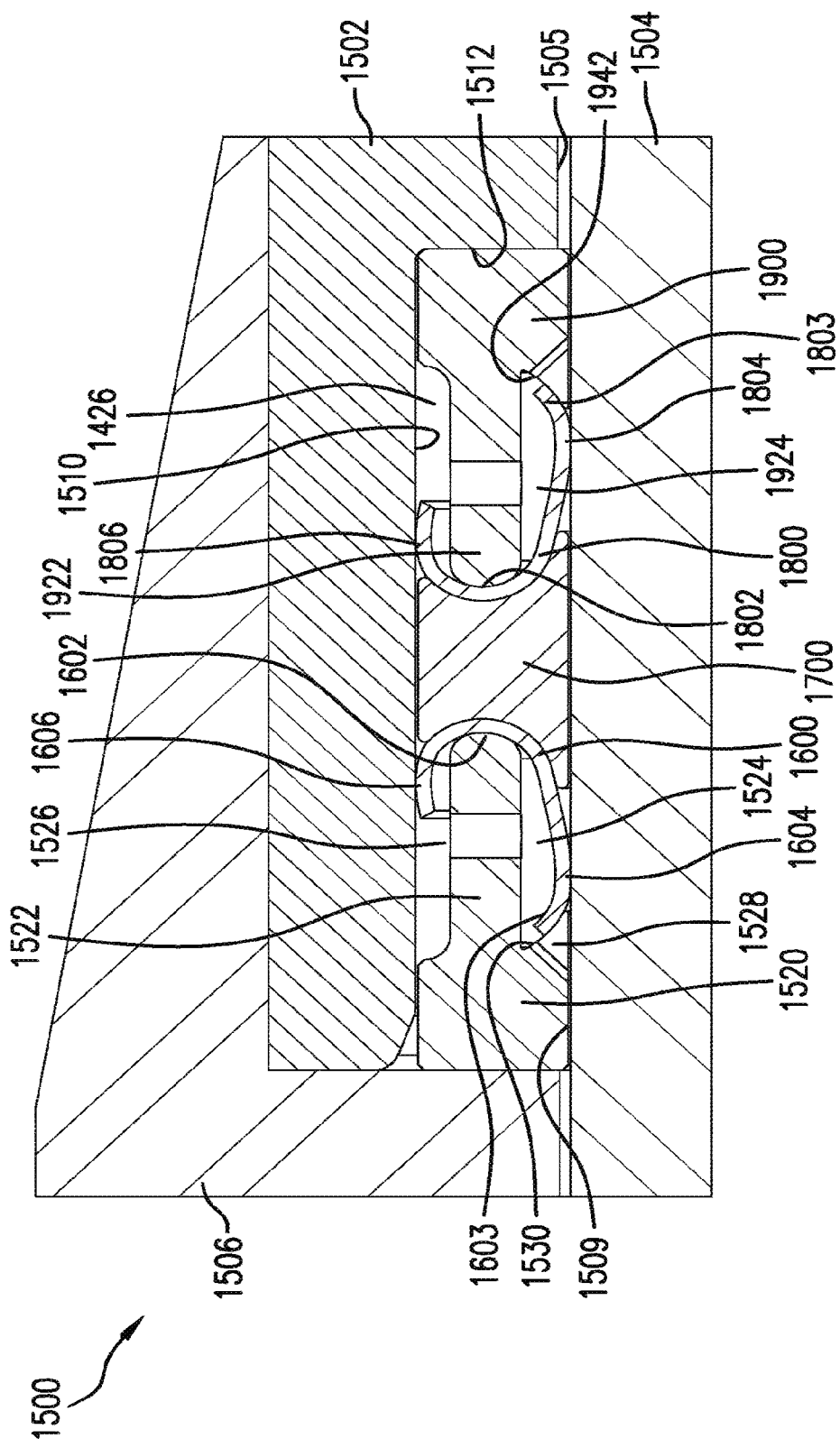
FIG. 12 is an enlarged view of a portion of the view shown in FIG. 11.
Figure 13:
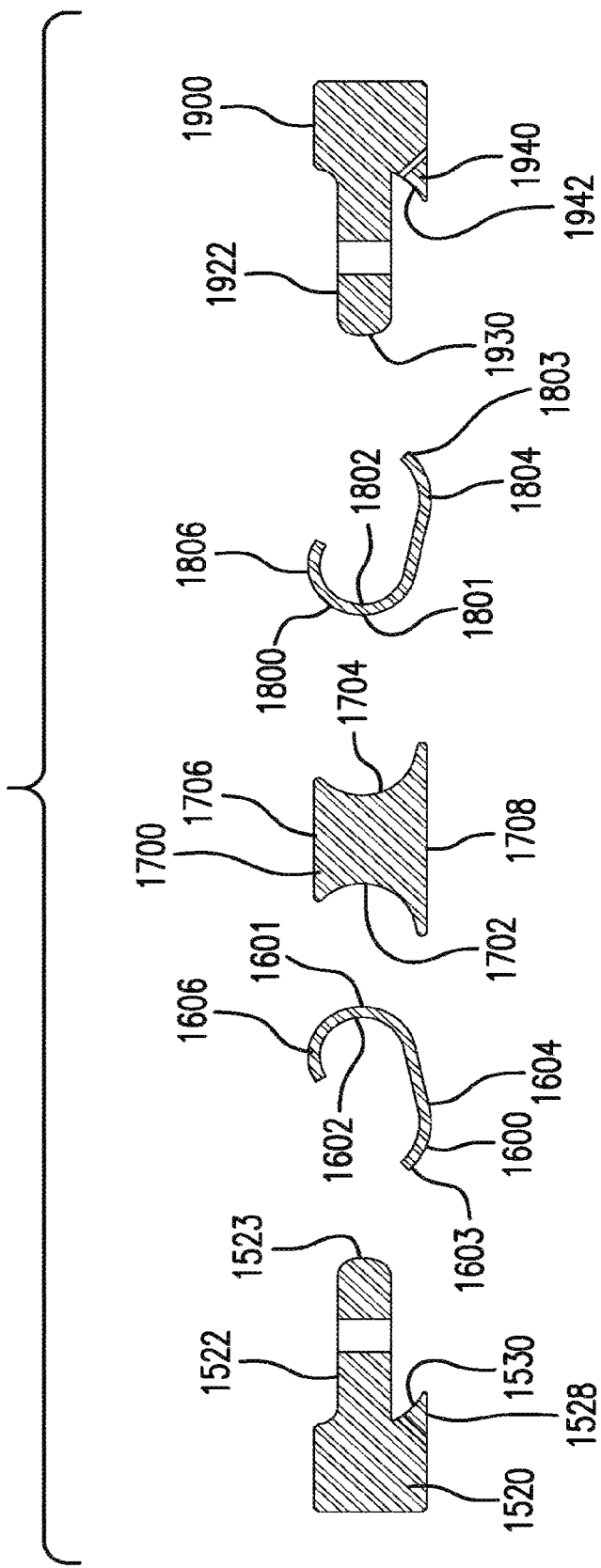
FIG. 13 is an exploded view showing components of the high-pressure bi-directional sealing system of FIG. 11.

Referring to FIGS. 11-13, there is shown sealing system 1500 in accordance with another embodiment of the present invention. Sealing system 1500 comprises outer or female tube 1502 and inner or male tube 1504 which is telescopically disposed within outer tube 1502. Circumferentially extending locking member 1506 is removably attached to outer tube 1502. In one embodiment, circumferentially extending locking member 1506 is screwed onto outer tube 1502 via threads (not shown). Outer tube 1502 has an interior surface 1505. Inner tube 1504 has interior region 1508 and an exterior surface 1509. Outer tube 1502 has a first portion that has a first inner diameter D7 and a second portion that has a second inner diameter D8 that is greater than the first inner diameter D7. The difference in diameters D7 and D8 forms a circumferentially extending shoulder 1510 and circumferentially extending vertical wall 1512 that is contiguous with shoulder 1510. Shoulder 1510 is part of interior surface 1505. The difference in diameters D7 and D8 also forms a circumferentially extending space or spatial region that is between shoulder 1510 and exterior surface 1509 of inner tube 1504. Components of the sealing system 1500 are located in the aforesaid circumferentially extending space or spatial region between shoulder 1510 and exterior surface 1509. Outer tube 1502 and inner tube 1504 are fabricated from metal or metal alloys, e.g. Steel, stainless steel, iron, copper, brass, nickel, nickel alloys, titanium, etc.

Referring to FIGS. 11-13, the sealing system 1500 comprises a circumferentially extending outer support ring 1520 that is positioned between exterior surface 1509 and shoulder 1510 via floating placement. Outer support ring 1520 abuts retaining member 1506. Outer support ring 1520 comprises a seal support section 1522 which has a shape and structure that forms a first space or spatial region 1524 between seal support section 1522 and exterior surface 1509, and a second space or spatial region 1526 between seal support section 1522 and shoulder 1510. Sealing system 1500 further includes circumferentially extending annular, axial seal 1600. Seal 1600 has the same structure and performs the same function as seal 1100 described in the forgoing description. Seal 1600 has curved or arcuate portion 1601 which has an inner curved surface 1602. Seal 1600 further comprises an end portion 1603. The dynamic portion of seal 1600 is indicated by reference number 1604 and the static portion of the seal 1600 is indicated by reference number 1606. Seal support section 1522 functions as a probe and supports the curved inner surface 1602 of seal 1600. Specifically, seal support section 1522 has a rounded end 1523 which contacts curved inner surface 1602. The dynamic portion 1604 of seal 1600 is located within space 1524 and the static portion 1606 of seal 1600 is located in space 1526. Outer support ring 1520 includes circumferentially extending support structure 1528 which supports the dynamic portion 1604 of seal 1600. Specifically, support structure 1528 includes portion 1530 which has a curvature that corresponds to the curvature of end portion 1603 of seal 1600. End portion 1603 abuts portion 1530 of support structure 1528 (see FIG. 12). Dynamic portion 1604 bears against exterior surface 1509 of inner tube 1504. Dynamic portion 1604 slides against exterior surface 1509 when inner tube 1504 moves with respect to outer tube 1502. Dynamic portion 1604 also contacts exterior surface 1509 when outer tube 1502 moves with respect to inner tube 1504. Static portion 1606 contacts or bears against the shoulder 1510. There is no relative motion between static portion 1606 and shoulder 1510. At all times, seal 1600 maintains a seal between exterior surface 1509 and shoulder 1510 as a result of the constant contact between dynamic portion 1604 and exterior surface 1509 and the constant contact between static portion 1606 and shoulder 1510.

Referring to FIGS. 11-13, sealing system 1500 further comprises a circumferentially extending inner support ring 1700 that is positioned via floating placement within the space or spatial region between shoulder 1510 and exterior surface 1509. Inner support ring 1700 is positioned between seals 1600 and 1800. Circumferentially extending seal 1800 has the same structure and function as seals 600 and 1300 which were described in the foregoing description. Seal 1800 has a curved or arcuate portion 1801. Curved or arcuate portion 1801 has a curved inner surface 1802. Seal 1800 also includes an end portion 1803 which has a curvature therein. The dynamic portion of seal 1800 is indicated by reference number 1804. The static portion of seal 1800 is indicated by reference number 1806. Referring to FIGS. 12 and 13, inner support ring 1700 has side 1702 and opposite side 1704. Side 1702 is formed with a curvature that is sized and shaped to receive the curled or arcuate portion 1601 of the seal 1600. Side 1704 is formed with a curvature that is sized and shaped to receive the curled or arcuate portion 1801 of the seal 1800. Inner support ring 1700 has side 1706 that confronts shoulder 1510. There is no relative motion between side 1706 and shoulder 1510. Inner support ring 1700 also has side 1708 that confronts exterior surface 1509 of inner tube 1504. The width of side 1708 is relatively greater than the width of side 1706. There may be relative motion between side 1708 and exterior surface 1509. Inner support ring 1700 allows the seals 1600 and 1800 to retain their shape and function as intended under extreme pressure conditions. In a preferred embodiment, inner support ring 1700 is fabricated from metal or metal alloys.

Sealing system 1500 further comprises circumferentially extending outer support ring 1900 that is positioned between exterior surface 1509 and shoulder 1510 via floating placement. Outer support ring 1900 abuts wall 1512. Outer support ring 1900 comprises a seal support section 1922 which has a shape and structure that forms a first space or spatial region 1924 between seal support section 1922 and exterior surface 1509, and a second space or spatial region 1426 between seal support section 1922 and shoulder 1510. Seal support section 1922 functions as a probe and supports the curved inner surface 1802 of seal 1800. Specifically, seal support section 1922 includes rounded end 1930 which contacts the curved inner surface 1802 of seal 1800. The dynamic portion 1804 of seal 1800 is located within space 1924 and the static portion 1806 is located in space 1426. Outer support ring 1900 includes circumferentially extending support structure 1940 which supports the dynamic portion 1804 of seal 1800. Specifically, support structure 1940 includes a portion 1942 that has a curvature that corresponds to the curvature in end portion 1803 of seal 1800. End portion 1803 abuts portion 1942. Dynamic portion 1804 bears against exterior surface 1509 of inner tube 1504. Dynamic portion 1804 slides against exterior surface 1509 when inner tube 1504 moves with respect to outer tube 1502. Dynamic portion 1804 also contacts exterior surface 1509 when outer tube 1502 moves with respect to inner tube 1504. Static portion 1806 bears against the shoulder 1510. There is no relative motion between static portion 1806 and shoulder 1510. At all times, seal 1800 maintains a seal between exterior surface 1509 and shoulder 1510 as a result of the constant contact between dynamic portion 1804 and exterior surface 1509 and the constant contact between static portion 1806 and shoulder 1510.

Referring to FIG. 12, seals 1600 and 1800 are oriented in opposite directions. Specifically, the opening of seal 1600 is facing in a direction that is opposite to the direction in which the opening of seal 1800 is facing. This configuration allows sealing system 1500 to handle pressure in both directions.

As shown in FIG. 12, outer support ring 1520, seal 1600, inner support ring 1700, seal 1800 and outer support ring 1900 are positioned and retained between retaining member 1506 and wall 1512.

Referring to FIGS. 11 and 12, at all times, seal 1600 maintains a seal between exterior surface 1509 and shoulder 1510 as a result of the constant contact between dynamic portion 1604 and exterior surface 1509 and the constant contact between static portion 1606 and shoulder 1510. At all times, seal 1800 maintains a seal between exterior surface 1509 and shoulder 1510 as a result of the constant contact between dynamic portion 1804 and exterior surface 1509 and the constant contact between static portion 1806 and shoulder 1510.

An important feature of all of the embodiments of the sealing system of the present invention is that the movable tube of the sealing system can be completely disengaged from the sealing system under operating conditions. For example, in sealing system 1500, inner tube 1504 can be completely disengaged (i.e. Removed) from sealing system 1500 under pressure and reengaged (i.e. Reinstalled) at a later point in time and still maintain functionality.

In an alternate embodiment, the outer female tubes (e.g. outer tube 12) and the inner tube (e.g. inner tube 14) are configured to have the flange configurations described in United States Patent Application Publication No. US2008/0258407, entitled "Volumetric Sealing System", published Oct. 23, 2008, the disclosure of which published patent application is hereby incorporated by reference.

In alternate embodiments, seals 100, 300, 500, 600, 1100, 1300, 1600 and 1800 may be fabricated from non-metal materials such as ceramic, composite materials, plastic, polymers, Teflon, Teflon coated metals, etc.

The principles, preferred embodiments and modes of operation of the present invention have been described in the foregoing specification. This invention should not be construed as limited to the particular forms disclosed, as these are to be regarded as illustrative rather than restrictive. Variations and changes may be made by those skilled in the art without departing from the spirit of the invention. Accordingly, the foregoing detailed description should be considered as exemplary in nature and not as limiting the scope and spirit of the invention as set forth in the attached claims.

What is claimed is:

1. A sealing apparatus, comprising:
   an outer tube;
   an inner tube telescopically disposed within the outer tube;
   a first annular seal disposed about the inner tube;
   a first outer support ring comprising a seal support section configured to support the first annular seal and form a spatial region between the seal support section and at least one of the outer tube and the inner tube, wherein a portion of the first annular seal is received within the spatial region;
   a second annular seal disposed about the inner tube and oriented in an opposite direction from the first annular seal;
   a second outer support ring comprising a seal support section configured to support the second annular seal and form a spatial region between the seal support section and at least one of the outer tube and the inner tube, wherein a portion of the second annular seal is received within the spatial region; and
   at least one inner support ring disposed between the first annular seal and the second annular seal, wherein the at least one inner support ring is formed with a curvature configured to receive at least a portion of an arcuate portion of each of the first annular seal and the second annular seal.

2. The sealing apparatus of claim 1, wherein the inner tube comprises a reduced outer diameter portion, and wherein the reduced outer diameter portion forms an annular shoulder and an annular wall contiguous with annular shoulder.

3. The sealing apparatus of claim 2, further comprising: a retaining member removably attached to the inner tube, wherein the first annular seal, the first outer support ring, the second annular seal, the second outer support ring, and the at least one inner support ring are disposed between the retaining member and the annular wall.

4. The sealing apparatus of claim 2, wherein the reduced outer diameter portion forms an annular spatial region between the shoulder and an interior surface of outer tube.

5. The sealing apparatus of claim 4, wherein the first annular seal, the first outer support ring, the second annular seal, the second outer support ring, and the at least one inner support ring are disposed within the annular spatial region.

6. The sealing apparatus of claim 1, wherein the seal support section of the first outer support ring comprises a rounded end configured to support the arcuate portion of the first annular seal, and wherein the seal support section of the second outer support ring comprises a rounded end configured to support the arcuate portion of the second annular seal.

7. The sealing apparatus of claim 6, wherein the first outer support ring further comprises a support structure having a curvature that corresponds to a curvature of an opposing end portion of the first annular seal, and wherein the second outer support ring further comprises a support structure having a curvature that corresponds to a curvature of an opposing end portion of the second annular seal.

8. The sealing apparatus of claim 1, wherein the first annular seal and the second annular seal each comprise a dynamic portion and a static portion.

9. The sealing apparatus of claim 8, wherein the dynamic portion of the first annular seal and the second annular seal contact an interior surface of the outer tube and slide against the interior surface when the inner tube moves with respect to the outer tube.

10. The sealing apparatus of claim 9, wherein the static portion of the first annular seal and the second annular seal contact an outer surface of the inner tube.

11. The sealing apparatus of claim 10, wherein there is no relative motion between each of the first annular seal and the second annular seal and the inner tube.

12. The sealing apparatus of claim 1, wherein the first annular seal and the second annular seal maintain a fluid tight seal between the inner tube and the outer tube.

13. The sealing apparatus of claim 12, wherein the sealing apparatus is configured to handle pressure in both axial directions.

14. A sealing apparatus, comprising:
   an outer tube;
   an inner tube telescopically disposed within the outer tube, the inner tube comprising a reduced outer diameter portion that forms an annular shoulder and an annular wall that define an annular spatial region;
   a first annular seal disposed about the inner tube and within the annular spatial region;
   a first outer support ring disposed within the annular spatial region and comprising a seal support section configured to support the first annular seal and form a spatial region between the seal support section and the annular shoulder, wherein a portion of the first annular seal is received within the spatial region;
   a second annular seal disposed about the inner tube and disposed within the annular spatial region and oriented in an opposite direction from the first annular seal;
   a second outer support ring disposed within the annular spatial region and comprising a seal support section configured to support the second annular seal and form a spatial region between the seal support section and the annular shoulder, wherein a portion of the second annular seal is received within the spatial region; and
   at least one inner support ring disposed between the first annular seal and the second annular seal.

15. The sealing apparatus of claim 14, wherein at least one of the first outer support ring and the second outer support ring abuts the annular wall.

16. The sealing apparatus of claim 15, wherein the first annular seal and the second annular seal contact an interior surface of the outer tube and slide against the interior surface when the inner tube moves with respect to the outer tube.

17. The sealing apparatus of claim 16, wherein the first annular seal and the second annular seal contact the shoulder of the inner tube.

18. The sealing apparatus of claim 14, wherein the first annular seal and the second annular seal maintain a fluid tight seal between the inner tube and the outer tube.

19. The sealing apparatus of claim 18, wherein the sealing apparatus is configured to handle pressure in both axial directions.

* * * * *